(12) United States Patent
Saltsman et al.

(10) Patent No.: US 8,862,346 B2
(45) Date of Patent: Oct. 14, 2014

(54) SYSTEM AND METHOD FOR SIMULATING THE PERFORMANCE OF A VIRTUAL VEHICLE

(75) Inventors: Benjamin J. Saltsman, Bloomfield Township, MI (US); Xubin Song, Canton, MI (US); Benjamin J. Morris, Ann Arbor, MI (US); Chia-Hsiang Liu, Northville, MI (US); Zhijun Tang, Novi, MI (US)

(73) Assignee: Eaton Corporation, Cleveland, OH (US)

( * ) Notice: Subject to any disclaimer, the term of this patent is extended or adjusted under 35 U.S.C. 154(b) by 34 days.

(21) Appl. No.: 13/425,086

(22) Filed: Mar. 20, 2012

(65) Prior Publication Data
US 2013/0253782 A1    Sep. 26, 2013

(51) Int. Cl.
*G06F 7/00* (2006.01)
*G06F 17/00* (2006.01)
*G06F 19/00* (2011.01)
*B60W 10/10* (2012.01)

(52) U.S. Cl.
CPC ............... *G06F 17/00* (2013.01); *B60W 10/10* (2013.01)
USPC ................... 701/53; 701/51; 701/55; 701/56

(58) Field of Classification Search
CPC ........ B60W 10/06; B60W 10/10; G06F 17/00
USPC ......................................... 701/51, 53, 55, 56
See application file for complete search history.

(56) References Cited

U.S. PATENT DOCUMENTS

| | | | |
|---|---|---|---|
| 4,559,599 A | 12/1985 | Habu et al. | |
| 5,337,239 A | 8/1994 | Okuda | |
| 5,477,453 A | 12/1995 | Harashima | |
| 5,848,371 A | 12/1998 | Creger | |
| 5,880,362 A | 3/1999 | Tang et al. | |
| 6,830,537 B1 | 12/2004 | Hollenbeck | |

(Continued)

FOREIGN PATENT DOCUMENTS

| | | |
|---|---|---|
| EP | 2 246 686 A1 | 3/2010 |
| JP | 2000002553 A | 1/2000 |
| WO | 2011036512 A1 | 3/2011 |

OTHER PUBLICATIONS

English Abstract of Japan Application No. 2000 002553 A.

(Continued)

*Primary Examiner* — Behrang Badii
*Assistant Examiner* — Daniel L Greene
(74) *Attorney, Agent, or Firm* — Dykema Gossett PLLC

(57) ABSTRACT

A mobile computing apparatus simulates the performance of a virtual vehicle using the route, driving behavior and loading experience of a baseline vehicle. The baseline vehicle is instrumented and operational data is collected, forming a data set. The apparatus includes simulator logic configured to construct a duty cycle from the data set representative of the operation of the baseline vehicle during travel along the route (e.g., a loading duty cycle). The data set includes route data with distance and vehicle speed information, engine data associated with the engine, and operational element data. The logic defines a virtual vehicle that is the same as the baseline vehicle but that includes a virtual operational element, such as a transmission, that is different than that in the baseline vehicle. The logic determines a performance characteristic, such as fuel economy, of the virtual vehicle using the constructed duty cycle.

32 Claims, 8 Drawing Sheets

(56) References Cited

U.S. PATENT DOCUMENTS

| | | |
|---|---|---|
| 7,194,888 B1 | 3/2007 | Temkin et al. |
| 7,347,168 B2 | 3/2008 | Reckels et al. |
| 7,424,868 B2 | 9/2008 | Reckels et al. |
| 7,684,919 B2 | 3/2010 | Abusamra |
| 7,949,452 B2 | 5/2011 | Eriksson et al. |
| 2005/0240319 A1* | 10/2005 | Sawada .............................. 701/1 |
| 2006/0293822 A1 | 12/2006 | Lattemann et al. |
| 2008/0027612 A1* | 1/2008 | Eriksson et al. ................ 701/54 |
| 2008/0081729 A1 | 4/2008 | Sauvlet et al. |
| 2009/0138188 A1* | 5/2009 | Kores et al. .................... 701/117 |
| 2009/0321153 A1 | 12/2009 | Boeckenhoff et al. |
| 2010/0049400 A1 | 2/2010 | Duraiswamy et al. |
| 2011/0106388 A1 | 5/2011 | Boeckenhoff et al. |
| 2012/0022764 A1* | 1/2012 | Tang et al. .................... 701/102 |
| 2012/0232783 A1* | 9/2012 | Calkins et al. ................ 701/411 |
| 2013/0041552 A1* | 2/2013 | MacNeille et al. .......... 701/32.9 |

OTHER PUBLICATIONS

International Search Report issued in corresponding International (PCT) Patent Application No. PCT/US2013/032992 (Feb. 6, 2014).

Written Opinion issued in corresponding International (PCT) Patent Application No. PCT/US2013/032992 (Feb. 6, 2014).

Alexandrov et al., "Automotive Engineering: Engine Fuel Map Design", Nov. 18, 2008.

Nam et al., "Fuel Consumption Modeling of Conventional and Advanced Technology Vehicles in the Physical Emission Rate Estimator (PERE)," EPA420-P-05-001, Feb. 2005.

Ross, "Fuel Efficiency and the Physics of Automobies," Physics Dept., University of Michigan, Ann Arbor, MI 48109, 2004.

* cited by examiner

SYSTEM AND METHOD FOR SIMULATING THE PERFORMANCE OF A VIRTUAL VEHICLE

TECHNICAL FIELD

This document relates generally to a computer-implemented evaluation system, and more particularly to a system and method for simulating and comparing the performance of a virtual vehicle to a baseline vehicle with substantially the same driving cycle and behavior.

BACKGROUND

It is often desirable to measure certain performance characteristics of a powertrain system of a vehicle in order to establish a baseline level against which a differently configured vehicle can be gauged. For example, in the case where a component of the vehicle is proposed to be changed, it is desirable to be able to objectively understand the corresponding changes in performances. For example, in the commercial vehicle (e.g., truck) context, it is known to have a number of transmission choices from different manufacturers, so vehicle owners may consider what fuel economy benefits, if any, would be available were the truck to be configured with a transmission from a different manufacturer. In the case of a driver-controlled vehicle, however, it is often difficult to conduct rigorous and meaningful "A versus B" testing due to the effects of driving behavior as well as environmental variability, such as traffic, changes in the load carried by the vehicle, and the like. Accordingly, such comparisons are frequently met with a healthy dose of skepticism.

One approach for gauging the impact of a proposed vehicle change is to conduct a simulation, for example, a simulation to evaluate and analyze fuel economy (FE) performance. However, the results of such a simulation are routinely questioned for a number of reasons.

First, vehicle configurations that are set up for use in the simulation do not often match real-world conditions. For example, in the case of a delivery truck, the vehicle weight can change over time due to the loading and unloading of cargo along a delivery route. As known, vehicle weight strongly influences fuel economy, so accurate modeling of this variable is important. However, it is difficult if not nearly impossible to have exact tracking of weight changes for the simulation setup.

Second, the operational duty cycle used in a conventional fuel economy simulation is typically limited to a road grade and speed versus distance profile. This profile is typically referred to as a metric duty cycle. With the adoption of such duty cycles, conventional simulators will not produce accurate results unless certain information is known with some degree of accuracy, for example vehicle inertia information as well as other driving environmental factors, such as wheel rolling resistance and headwind velocity.

Third, conventional metric duty cycles do not take into account traffic conditions, particularly the driver's response to such conditions, which can cause unexpected "stop and go" operation of the vehicle along the driver's route, which can adversely effect fuel economy. In sum, conventional fuel economy simulators are of limited informational value because a number of underlying assumptions do not accurately reflect real-world driving conditions.

In view of the deficiencies in accurately predicting performance due to proposed vehicle equipment changes, vehicle owners are, perhaps rightfully, reluctant to move forward in making equipment upgrades and/or deciding to configure vehicles with certain equipment. This reluctance is particularly true where the cost/benefit or savings, relative to a baseline vehicle, cannot be clearly demonstrated. This reluctance is only amplified when considering fleet vehicle owners, who may control a plurality of vehicles. In the case of fuel economy, it is therefore not uncommon for vehicle fleet owners to make vehicle equipment decisions based on their own knowledge and experience as to their particular routes, driver behavior and vehicle configurations. This human-based judgment is sometimes qualified as one involving "my route, my driver, and my truck". In the absence of a tailored approach that quantitatively accounts for "my route, my driver, and my truck", a vehicle owner would rely on subjective analysis of performance, likely discount, if not disregard entirely, any performance (e.g., fuel economy) pertaining to a proposed equipment change.

There is therefore a need for a system and method for simulating the performance of a vehicle that minimizes or eliminates one or more of the shortcomings described above.

SUMMARY

An advantage of the embodiments described in this document is that they take into account the specific routes, driver behavior and vehicle configuration in making performance estimations (i.e., "my route, my driver, and my truck"). In an embodiment, an apparatus is provided for determining a performance characteristic of a virtual vehicle. The apparatus includes an electronic processor, a memory coupled to the processor; and simulator logic stored in the memory and configured to be executed by the processor. The simulator logic is configured to construct a duty cycle based on a data set representative of the operation of a baseline vehicle during travel along a route. The data set includes at least route data with distance and vehicle speed information, engine data associated with an engine of the baseline vehicle, and operational element data associated with a baseline operational element of the baseline vehicle. For example only, the operational element may be a transmission, although in alternate embodiments, the operational element may be an engine, an axle ratio, tire type and/or size, aerodynamic treatments and the like. The simulator logic is further configured to define a virtual vehicle that includes a virtual operational element that is different than, and substitutes for, the baseline operational element. Finally, the simulator logic is configured to determine a performance characteristic of the virtual vehicle using at least the constructed duty cycle. The duty cycle, being representative of the operation of a baseline vehicle ("my driver, my truck") during travel along a route ("my route"), overcomes the deficiencies in conventional simulation approaches.

In one embodiment, the constructed duty cycle corresponds to a loading duty cycle, which is configured to deliver the same speed and torque on the virtual vehicle as was collected during the operation of the baseline vehicle.

In another embodiment, an apparatus is provided for determining the fuel economy of a virtual vehicle. The apparatus includes an electronic processor, a memory coupled to the processor, and simulator logic stored in the memory and configured to be executed by the processor. The simulator logic is configured to construct a duty cycle based on a data set representative of the operation of a baseline vehicle during travel along a route. In an embodiment, the duty cycle may be a loading duty cycle with the same torque and speed as on the baseline vehicle, is indicative of the driving behavior of a driver of the baseline vehicle. The baseline vehicle includes an engine coupled to a baseline transmission wherein the data set includes at least engine data and transmission data. The simulator logic is further configured to define a virtual vehicle that is the same as the baseline vehicle but that substitutes a virtual transmission for the baseline transmission. Finally, the simulator logic is configured to simulate the operation of the virtual vehicle along the route in accordance with the constructed duty cycle in order to determine the projected fuel economy of the virtual vehicle.

In a further embodiment, a method is provided for operating a vehicle having a driveline that includes an engine and a multi-gear transmission having an output-shaft. The method includes a number of steps. One step involves producing, using an engine fuel usage map defined for engine speed and torque, a respective driveline fuel map defined for an output-shaft driving torque and speed for each gear of the transmission. Another step involves determining, during operation, an effective output-shaft driving torque and speed. A further step includes identifying, using at least the output-shaft driving torque and speed, one or more feasible gears whose corresponding engine operating point lies within an engine torque-speed profile. A still further step involves selecting from the feasible gears a candidate gear having the lowest fuel usage. The selecting step uses the driveline fuel maps and the determined output-shaft driving torque and speed. A further step includes shifting the transmission to the candidate gear.

In a still further embodiment, an apparatus is provided for determining a drive cycle of a vehicle over a predetermined route. The apparatus includes an electronic processor, a memory coupled to the processor, and map interaction simulation logic stored in the memory and configured to simulate the operation and movement of a vehicle over the predetermined route in accordance with a map system. The map system includes road data and traffic condition based on historical patterns for a given day of the week and time of day. The map interaction simulation logic is further configured to produce vehicle operation data and vehicle trip data. The apparatus also includes drive cycle construction logic stored in the memory. The drive cycle construction logic is configured to output a representative drive cycle based on the produced vehicle operation data and the vehicle trip data.

The foregoing and other aspects, features, details, utilities, and advantages of the present disclosure will be apparent from reading the following description and claims, and from reviewing the accompanying drawings.

DETAILED DESCRIPTION

Before proceeding to a detailed description of a fuel economy simulator, an overview description of such an apparatus will first be described. The initial description will describe in general how a user interacts with the apparatus, in both setup and in executing the simulation in order to obtain the projected fuel economy of a virtual vehicle. This document will also describe various embodiments for implementing the apparatus, as well as variations.

Figure 1:
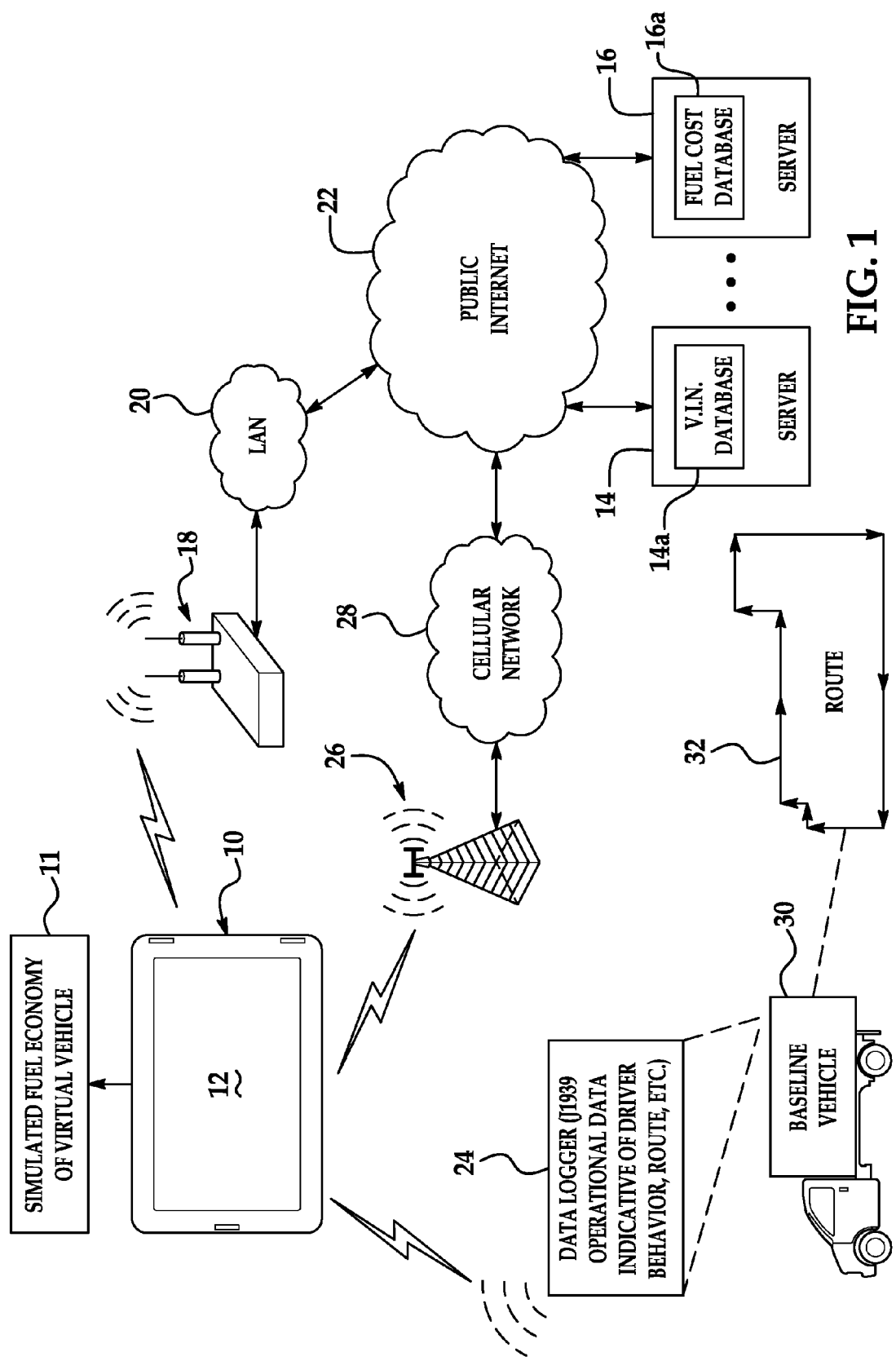
FIG. 1 is a diagrammatic view of an apparatus for use in determining a performance characteristic of a virtual vehicle.

Referring now to the drawings wherein like reference numerals are used to identify identical components in the various views, FIG. 1 is a diagrammatic view of an apparatus 10 in an exemplary environment. As set forth in the Background, the major challenge faced when predicting future performance of a vehicle with proposed changes in components ("the virtual vehicle") for comparison with an actual vehicle as currently equipped ("the baseline vehicle") involves accurately characterizing and then simulating route, driver behavior and environmental conditions.

Embodiments described herein follow a workflow that involves first recording relevant vehicle operational data associated with the baseline vehicle, which is representative of the desired vehicle route, driver behavior, and environmental variability (e.g., traffic, etc.). This information is used to define a baseline duty cycle, which can then be used for simulation purposes with respect to a virtual vehicle. The virtual vehicle is generally the same as the baseline vehicle except that it includes a changed component whose effect on performance is being determined. The simulation then replicates the baseline vehicle duty cycle but with respect to the virtual vehicle, and observing resultant performance. Through the use of a duty cycle tailored to the specifics of the baseline vehicle, a more accurate prediction can be made of the performance of the virtual vehicle. This in turn allows a more meaningful "A versus B" performance comparison. This approach also satisfies a customer's desire to have performance characteristics, such as fuel economy, calculated using "my route, my driver, and my truck" qualifications, thus overcoming the problems set forth in the Background.

Exemplary Apparatus Description. With continued reference to FIG. 1, apparatus 10, in the illustrated embodiment, may be a tablet computer or the like and is configured generally to produce an output representing the simulated or projected fuel economy of a virtual vehicle, as shown in block 11.

Apparatus 10 may be configured for portability and ease of operation and thus may include a touch-sensitive display 12 as well as mobile communication capabilities. In a constructed embodiment, apparatus 10 comprises a commercially available component available under the trade designation IPAD, from Apple Inc., Cupertino, Calif., USA. It should be noted that the simulator function performed by apparatus 10, while useful for technical evaluation purposes, may also be useful for other purposes, such as for sales and the like. For example, apparatus 10 may be used to illustrate to a potential customer the positive financial impact of a proposed change in one or more components of a baseline vehicle, for example fuel savings due to improved fuel economy. Portability and connectivity benefits the user of apparatus 10, who can accommodate a customer's preferred time and place to receive such a presentation without such limitations. Apparatus 10 may alternatively take the form of any of a wide variety of other devices configured for wireless communication with a cellular and/or a short-range network (e.g., WiFi), such a notebook computer, a Smartphone, or the like. While mobile communication capabilities are useful, such functionality is not essential, and thus in a still further embodiment, apparatus 10 may be a desktop computer.

For at least the purpose of conducting the fuel economy simulation, apparatus 10 is configured for data communication to one or more remote systems in order to retrieve needed or useful information. As shown in FIG. 1, such remote systems may include a Vehicle Identification Number (VIN) server 14 having a VIN database 14*a* and a fuel cost server 16 having a fuel cost database 16*a*. Apparatus 10 may include conventional communication capabilities for communicating with remote servers 14, 16. For example, apparatus 10 may include a first wireless network interface (e.g., WiFi—IEEE 802.11 or Bluetooth standards) configured for connection, by way of wireless access point 18, to a first network 20. First network 20 may be a local area network (LAN), but could alternately be a wide area network or the like (e.g., in the case of a WiFi hotspot). The first network 20 may in turn be connected to network 22, such as the public Internet, for completing access to servers 14, 16. The wireless interface may also be used to wirelessly retrieve baseline vehicle data from a data logger 24, as described below.

Apparatus 10 and data logger 24 may further include a second wireless network interface configured for connection, for example by way of base transceiver station 26 or the like, to a second network, which may be a cellular communications network 28. Network 26 may in turn be also connected to network 22 for completing access to servers 14, 16. Generally, second wireless network interface may include conventional components compatible with analog and/or digital cellular communications networks (i.e., 2G/3G/4G).

FIG. 1 further depicts a baseline vehicle 30 in relation to a route 32 over which baseline vehicle 30 travels. In an embodiment, baseline vehicle 30 may be a medium duty truck, powered by a diesel cycle engine and having an automatic gearchange transmission, although an automatic transmission is not required. In other words, the transmission on the baseline vehicle may be non-automated. Route 32 may be, for example, a delivery route taken by vehicle 30 during a single day, where cargo is loaded and unloaded at several stops. The loading and unloading of cargo can significantly affect the vehicle weight.

It is not uncommon for the owner of vehicle 30 to select a specific transmission for his/her vehicle. In other words, the engine and transmission are not typically offered by the same manufacturer. It is because of this choice that owners wish to be as knowledgeable as possible about their options. Furthermore, as mentioned in the Background, with this ability to choose, the owner typically insists on performance information that is very specific to the intended use of the vehicle (i.e., "my route, my driver, my truck"). And while this document describes an embodiment where the component to be evaluated is a transmission, this component is exemplary only. For example, alternate embodiments may be configured to analyze alternate components other than a transmission, including without limitation an engine, one or more tires (e.g., changes as to either model or size), an axle (e.g., an axle ratio change), aerodynamic treatments and the like (generally referred to as an "operational element"). Moreover, while fuel usage/economy is the performance characteristic of interest in the embodiment of FIG. 1, it should be understood that other vehicle performance characteristics, such as engine performance characteristics, can also be the performance characteristic of interest.

Data logger 24 is configured to collect data relating to the operation of baseline vehicle 30, data that is at least sufficient to construct a driver duty cycle representative of the route driven by the driver (i.e., route 32—"my route"), the driving behavior of the driver (i.e., "my driver") as well as one or more configuration or performance characteristics of baseline vehicle, other than the component being change for the simulation (i.e., "my truck"). In an embodiment, the data logger 24 is configured for a number of connections, including at least a first connection for the purpose of collecting baseline vehicle data. For this purpose, data logger 24 is configured to be electrically connected to a system bus of vehicle 30 through a J1939 compliant connection or interface ("J1939 interface"). Through the J1939 interface the data logger 24 gains access to the vehicle bus (e.g., CAN bus), which in turn allows collection of available vehicle operating data over time. The collected data may include engine throttle position (from which throttle rate of change can be determined), engine fuel usage reported by the engine control module (ECM), various engine operating parameters such as the actual engine speed, the actual engine torque, transmission output-shaft (OS) speed and vehicle speed. In certain embodiments, engine torque may be reported through the J1939 interface as a percentage of an engine reference torque (and thus this reference value would also be obtained). In further embodiments, an engine nominal friction torque (%'age) may be supplied, which can be collected in order to calculate net engine torque. The foregoing data are examples of dynamic data types (i.e., changing over time). Data logger 24 is also configured to obtain static data types, such as the engine size, the transmission type, the vehicle identification number (VIN) and the like. It should be understood that variations are possible. Data logger 24 also may include short-range wireless communication capability, such as a WiFi or Bluetooth compliant wireless interface or cellular wireless interface.

Data logger 24 may also have a global positioning system (GPS) device (not shown) associated therewith, such as through external connection to data logger 24 or incorporated within data logger 24. The GPS device is provided for the purpose of recording vehicle location information as vehicle 30 travels along route 32.

All data collected by data logger is time-stamped or otherwise associated with the time at which it was collected or at which it is valid. The timing information can be used in post-processing of the collected data. Data logger 24 also includes non-volatile memory to store the collected data.

Referring now to FIGS. 1-4, a description of the operation of apparatus 10 from the perspective of the user will now be set forth. For context, assume that the owner of vehicle 30 currently operates the vehicle with a baseline transmission that is manufactured by a first business entity. A second business entity—the user of apparatus 10, would like to convince the owner of vehicle 30 to purchase its transmission as an upgrade component or in a new vehicle but needs to demonstrate to the owner that its transmission will yield fuel economy benefits. As mentioned above, the owner applies a "my route, my driver, my truck" standard in assessing assertions of improved fuel economy. His own, existing vehicle configuration may be the only source of fuel economy information that meets this standard. In the absence of apparatus 10, the owner would likely discount, if not disregard entirely, any fuel economy assertions pertaining to the replacement transmission offered by the user. Apparatus 10 is configured to demonstrate to the owner, under the owner's own "my route, my driver, my truck" standard, the performance of the replacement transmission including fuel economy differences, if any. The workflow or process involves a number of steps.

Data Collection. The first step involves data collection. The user (or designee) installs data logger 24 on the owner's baseline vehicle 30. Data logger 24, in an embodiment, is connected to the vehicle's internal communication bus (e.g., CAN bus), as described above. The vehicle 30, thus instrumented, is then driven for a time period sufficient for data logger 24 to collect data that meaningfully represents route variation (including influences of traffic, weather and the like), driver behavior as well as the overall vehicle operation. It is known that driver behavior can have a significant impact on fuel consumption, and thus it is important to account for this information beyond that accounted for by conventional metric duty cycle information, such as the vehicle speed versus distance profile. For example only, the data collection time period may be between about 1-4 weeks, and preferably may be between about 1-2 weeks. The data collected—a data set—is sufficient to extract or otherwise construct a representative driver duty cycle. In an embodiment, data may be compressed or selectively recorded in order to optimize storage requirements and data file size.

Data Transfer. The second step involves transferring the data set from data logger 24 to apparatus 10. When the data collection time period has passed, the user of apparatus 10 (or designee) returns to the owner's premises and removes data logger 24 from the baseline vehicle 30 and imports the collected data set into apparatus 10. Apparatus 10 may also be configured to input and analyze data sets from a plurality of baseline vehicles so that the owner can gain a deeper understanding of operational variability. Data may be transferred in real time or in batches over wireless or cellular network interface.

Figure 2:
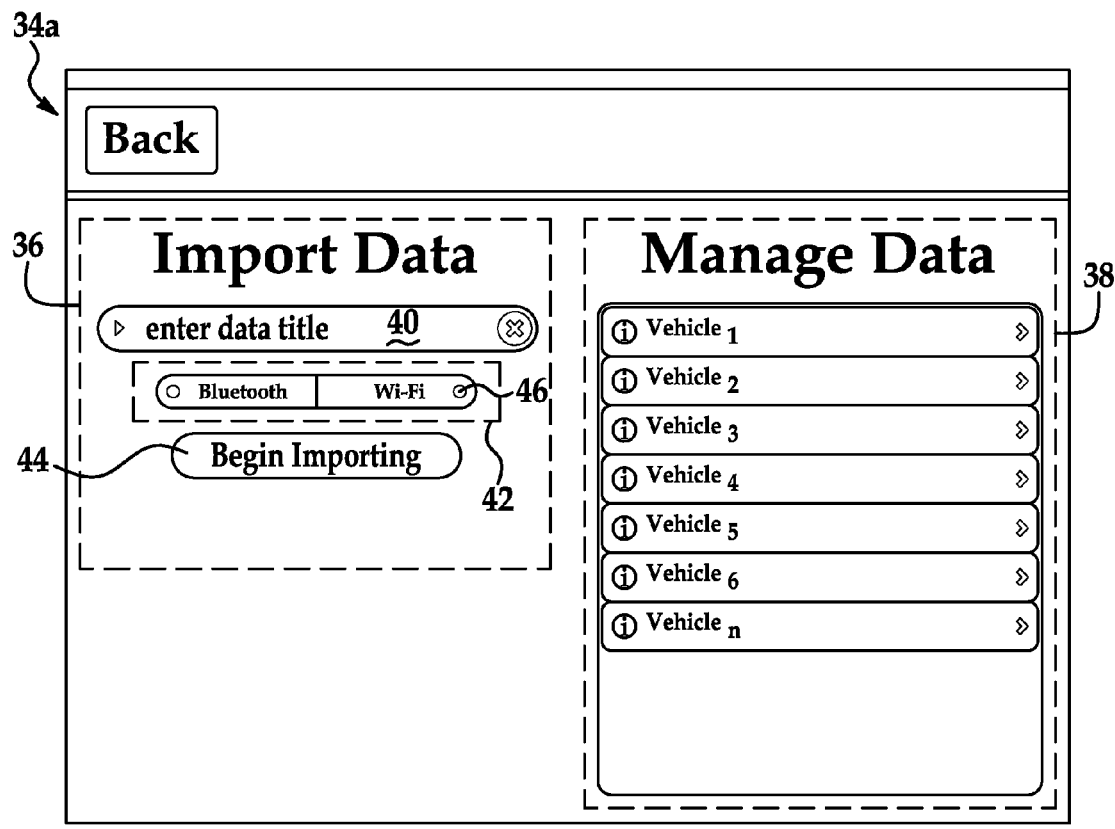
FIG. 2 is a screen display of the apparatus of FIG. 1 showing a data set import interface and a data set management interface.

FIG. 2 is a screen display on display 12 of apparatus 10 showing a user interface, designated as a user interface 34a. Subsequent views of the user interface, as experienced by the user, will be referred to as user interface 34b and user interface 34c. User interface 34a includes a data set import interface 36 and a data set management interface 38. The data set can be transferred from data logger 24 by way of a memory card, a wired connection, a wireless connection, cellular connection or any other suitable connection, in whole or in batches. In an embodiment, the data set transfer is accomplished through a wireless connection. For this purpose, interface 36 is configured to allow the user to name the data set, for example, through a text input box 40, to select the wireless connection through selection of either a Bluetooth or a Wi-Fi button enclosed in dashed-line box 42, and finally to initiate the transfer itself by selecting button 44 ("Begin Importing"). The import interface 36 may include further features. For example, in the illustrated embodiment, the Wi-Fi button may include a graphic designation 46 indicating in a first mode (e.g., green color) that the Wi-Fi connection has been properly configured and indicating in a second mode (e.g., a red color) that the Wi-Fi connection has not been properly configured. The user is instructed through separate "Help" interface or through manual user guide materials to check the communication settings when designation 46 operates in the second mode ("red" color).

Data set management interface 38 is configured to allow the user to analyze and/or review a previous analysis of a data set that has already been imported into apparatus 10. For example, interface 38 in FIG. 2 shows a plurality of already-named data sets, any one of which can be selected by the user by selecting the button associated with the desired data set.

Data Processing. The third step involves data processing of the imported data set. As an initial matter, apparatus 10 is configured to retrieve vehicle information in accordance with the VIN of baseline vehicle 30. As shown in FIG. 1, apparatus 10, through one of its communication interfaces, performs a VIN lookup by transmitting a VIN lookup request to remote VIN server 14. VIN server 14 responds to apparatus 10, providing the VIN information to apparatus 10.

[This space intentionally left blank.]

Table 1 below shows exemplary information retrieved from a VIN lookup performed by apparatus 10.

TABLE 1

Typical VIN Information

| Vehicle Category | Vehicle Specifications |
| --- | --- |
| VIN | XXXXXXXXXXXXXXXXX |
| Lookup Result | Perfect match |
| Make | VEHICLE OEM-1 |
| Model | MEDIUM DUTY |
| Model Year | 2011 |
| Engine Manufacturer | ENGINE OEM-1 |
| Engine Series | XXX |
| Engine Capacity | 6 cyl, 6.7 L (409 CID) |
| Fuel Type | Diesel |
| Cab Type | Medium Conventional |
| Chassis | Truck |
| Drive Line Type | Conventional Cab (4x2) |
| Brake System | AIR BRAKE |
| GVWR Class | 19501-26000 lbs. |
| Country | UNITED STATES |
| Segmentation | Medium/Heavy Trucks |

As described in greater detail below, apparatus 10 is configured to execute fuel economy simulator logic (best shown in FIG. 5) that processes the imported data set, among other information, to determine not only the fuel usage and fuel economy (MPG) of baseline vehicle 30, but also to determine the projected fuel usage and fuel economy of a so-called virtual vehicle (i.e., that which includes the replacement transmission).

The simulator logic is configured to perform a number of steps to determine the projected fuel usage and fuel economy of the virtual vehicle. The first step involves constructing a duty cycle based on the imported data set, which is representative of the operation of the baseline vehicle as driven along the predetermined route. The next step involves defining a virtual vehicle that is the same as the baseline vehicle but that substitutes a virtual transmission for the baseline transmission. Finally, the logic simulates the operation of the virtual vehicle along the same route in accordance with the reconstructed vehicle/driver duty cycle, to determine the projected fuel economy of the virtual vehicle.

The simulator logic is further configured to obtain various input data from the user, such as information to establish values for a group of predetermined driveline settings that will be used in the simulation. For example, Table 2 sets forth typical driveline parameters and corresponding values entered by the user. Although not shown in Table 2, the simulator logic is also configured to allow the user to specify a series of gear ratios (e.g., in order from lowest gear to highest gear, such as [9.01; 5.27; 3.22; 2.04; 1.36; 1.00]). The simulator logic is configured to obtain these driveline parameters for both the baseline transmission, as in the column captioned "Baseline" in Table 2, as well as for the virtual transmission, as in the column captioned "Virtual (Projected)" in Table 2. In a constructed embodiment where apparatus 10 is an IPAD tablet computer running a version of the IOS operating system, such driveline setting may be established by the user through the Settings icon.

TABLE 2

Typical Driveline Configuration Data

| Vehicle Configuration Transmission | Baseline Baseline Trans. | Virtual (Projected) Eaton UltraShift 6-speed |
|---|---|---|
| Axle Ratio | 5.57 | 5.13 |
| Wheel Diameter, rev/mile | 498 | 498 |
| Tire Size | 255/75 R22.5 | 255/75 R22.5 |

Results. The final step in the process involves providing the results of the simulation to the user. This may take the form of displayed animations, charts, numeric results, financial implications as well as an electronic report. Table 3 below sets forth exemplary simulation results.

TABLE 3

Exemplary Simulation Results

| Trip Category | Trip Details |
|---|---|
| Date | XX/XX/XXXX |
| Trip Distance | 72.95 miles |
| Elapsed Time | 9 hours 6 minutes |
| Current (Baseline Vehicle) Fuel Consumption | 7.2786 gal |
| Projected (Virtual Vehicle) Fuel Consumption | 6.6804 gal |
| Difference | 0.5983 gal |
| Current Average Transmission Mechanical Efficiency (M.E.) | 92% |
| Projected Average Transmission Mechanical Efficiency (M.E.) | 98% |
| Idle Time | 4% |
| Hard Acceleration | 1% |
| Hard Braking | 15% |

As mentioned above, the simulator logic is configured to calculate the actual fuel usage of the baseline vehicle ("Current Fuel Used") as well as the projected fuel usage of the virtual vehicle ("Projected Fuel Used"), which are both reported in addition to the route distance, drive time and date. In addition, the simulator logic determines and reports the difference in fuel usage between the baseline vehicle and virtual vehicle.

The simulator logic also determines and reports the mechanical efficiency of both the baseline transmission and the virtual transmission. This information facilitates understanding as to actual/projected performance benefits of one transmission over the other. In other words, this kind of information helps the customer understand the underlying reasons for the simulation results.

The simulator logic also analyzes the information contained in the imported data set to determine at least one driver behavior index. These indices can be displayed and included in a report. The indices can also help the customer and/or the user understand the driving behavior applicable to the particular data set under analysis. The indices may include, without limitation, an idle time index, a hard acceleration index, a hard braking index and cruise driving index. As known, idle time as well as hard acceleration and braking can increase fuel consumption and thus adversely affect fuel economy. It is therefore important to understand the contributing influences, not only the end result. In an embodiment, vehicle acceleration can be derived from vehicle speed and then used to characterize hard braking and hard acceleration per its numeric value range. Furthermore, the acceleration signal can be used together with speed (and other data if necessary) to identify other driving events, such as cruise driving and idle time.

Figure 3:
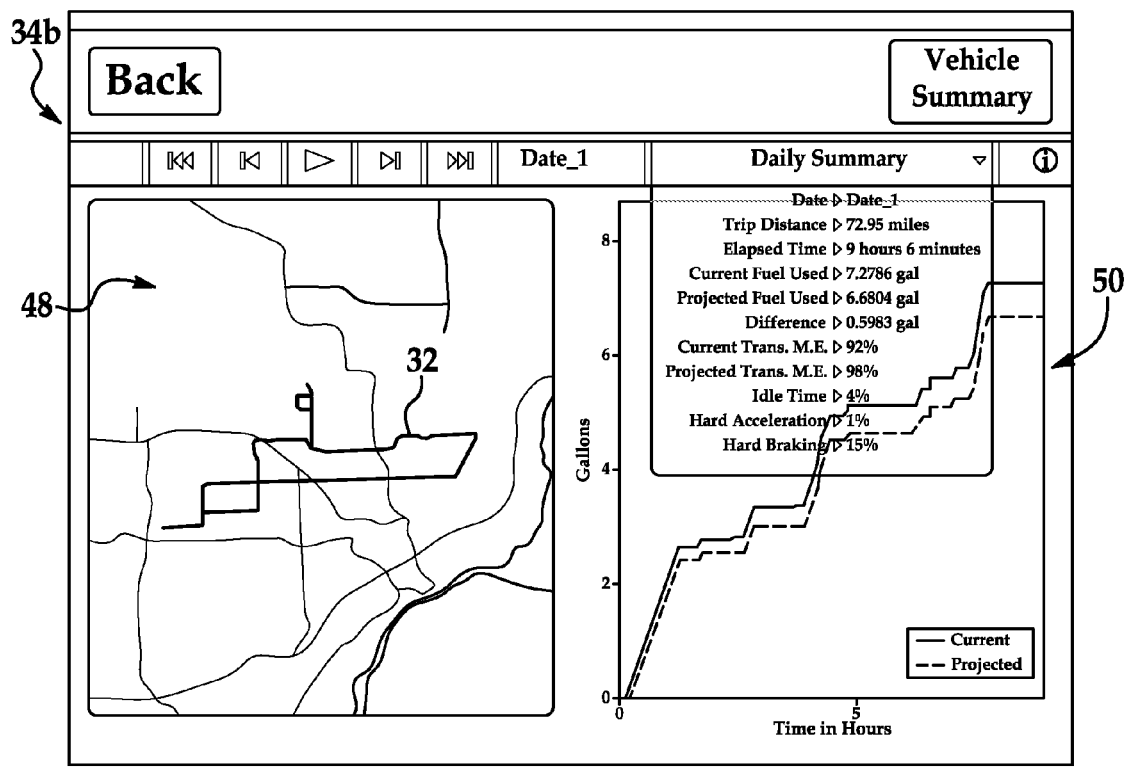
FIG. 3 is a screen display of the apparatus of FIG. 1 showing an animation representing the traveled route of a baseline vehicle and a chart showing the difference in fuel usage between the baseline vehicle and the virtual vehicle.

FIG. 3 is a view of display 12 showing user interface 34b, which shows sample outputs of the simulator logic. For example, the user interface 34b may includes an animation pane 48 and a fuel usage chart 50. The animation pane 48 replays the route taken by vehicle 30 (and the virtual vehicle in-simulation) in synchronization with the accrued fuel usage for the both vehicles in chart 50.

One feature of simulator logic is the ability to segregate information contained in the imported data set on a per-day basis. Once this segregation has been performed, then the simulator logic can produce simulation results also on a per-day basis for display and reporting. In an embodiment, the simulator logic also allow the particular day to be analyzed to be user-selected.

The animation pane 48 is set up such that a user can selectively cause an animation to be displayed, where the animation reflects the route traveled by the baseline vehicle on the selected day. Concurrent with the animation, the simulator logic continuously updates chart 50, which shows the running or accrued difference in fuel used between the baseline and virtual vehicles. In an embodiment, the chart is progressively "drawn" (i.e., along the X-axis—time) to match the progress of the vehicle in the animation.

Figure 4:
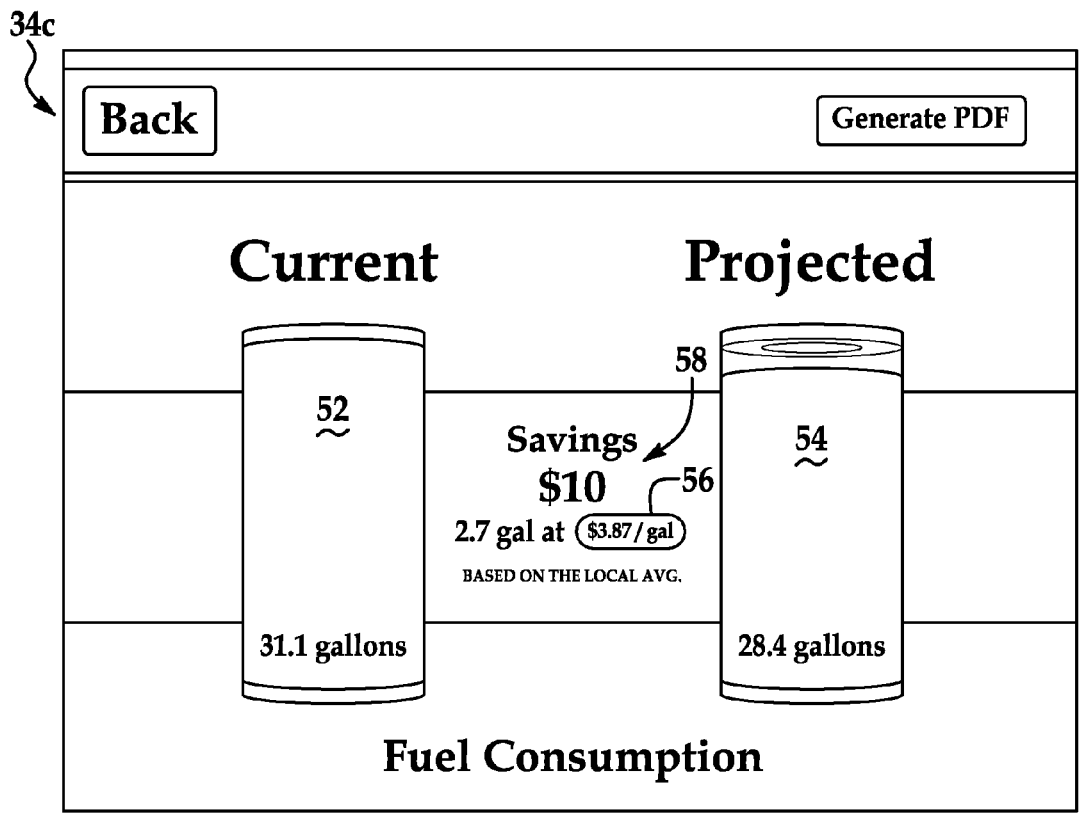
FIG. 4 is a screen display of the apparatus of FIG. 1 showing a fuel price input interface and a cost difference.

FIG. 4 is a view of display 12 showing user interface 34c, which shows, in graphical form, the difference in fuel usage between the baseline vehicle and the virtual vehicle. The fuel used by the baseline vehicle is output as a bar chart 52 while the fuel used by the virtual vehicle is output as a bar chart 54. A further feature of the simulator logic includes the ability to automatically produce a financial parameter indicating the financial impact due to the difference in fuel economy between the baseline vehicle and the virtual vehicle. As shown, the difference in fuel usage, when assessed at a fuel cost (per unit), shown by reference numeral 56, results in savings, expressed in dollars, shown by reference numeral 58. The savings can be further projected on an annualized basis.

In an embodiment, the simulator logic is configured to automatically determine its own current geographical location and based on this location information, determine a local average fuel cost (per unit). For this purpose, apparatus 10 incorporates a location means for determining the current location of the apparatus. In one embodiment, the location means may be a global positioning system (GPS) unit, for example, integrated within apparatus 10. Other approaches are known in the art for determining a user's location, based on cellular network and/or WiFi access points.

In an embodiment, the simulator logic is configured to transmit a request, which includes the current geographic location, to fuel cost server 16. Fuel cost server 16, after referencing database 16a, sends apparatus 10 a response that includes at least the local average fuel cost (per unit cost). The server 16 may also provide a national average fuel cost. Appropriate fuel is automatically determined based on the baseline vehicle VIN.

In a further embodiment, however, the simulator logic is configured to receive a user-specified fuel cost. This user-specified value over-rides the automatically determined per unit fuel cost. For example, the simulator logic allows the user to select button 56 (FIG. 4), which initiates a dialog that allows the user to thereafter enter a numeric value.

The simulator logic is also configured to generate a report (see FIG. 4: "Generate PDF" button) summarizing the results of the analysis. The simulator logic may also be configured to attach the generated report to an email message. The user can then specify the destination email address of the recipient to receive the report, all from mobile apparatus 10.

Through the foregoing, a user of apparatus 10 is enabled to convincingly demonstrate to a customer the asserted performance adjustments of a proposed equipment change to his vehicle. The simulated performance is convincing for at least the reason that it meets all the conditions of the customer, such as "my route, my driver, my truck". A detailed description of embodiments for implementing apparatus 10 will now be described.

Figure 5:
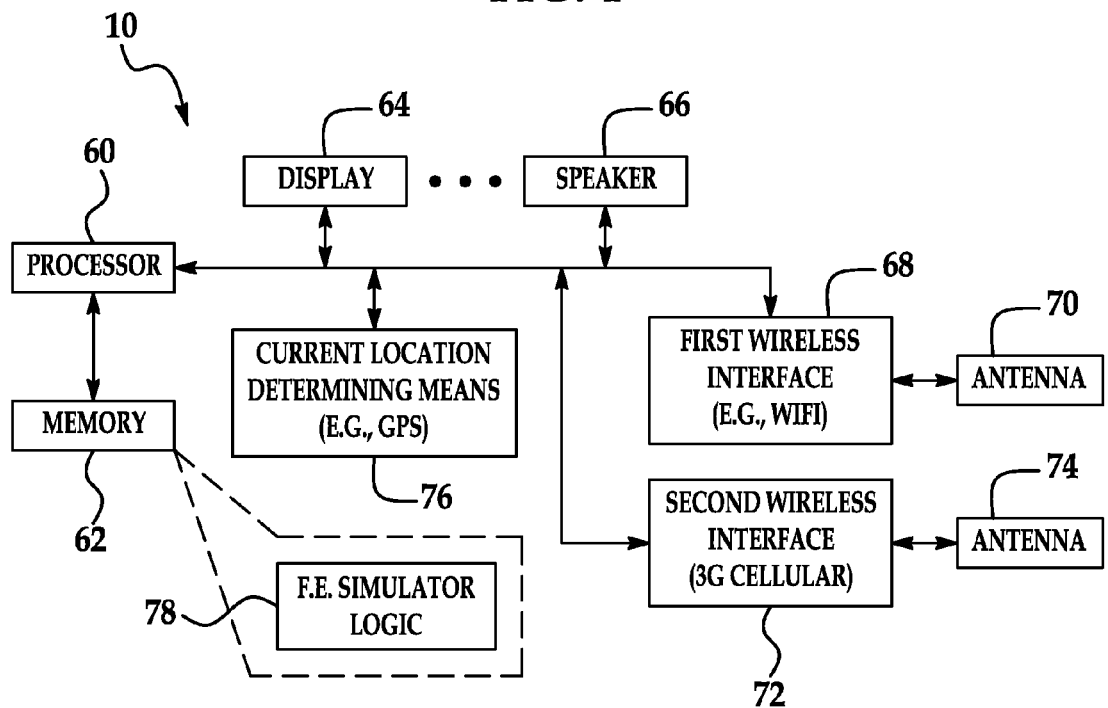
FIG. 5 is a block diagram showing the apparatus of FIG. 1, which includes fuel economy simulator logic.

FIG. 5 is a block diagram showing, in greater detail, an embodiment of apparatus 10. Apparatus 10 may include an electronic processor 60, a memory 62, a variety of input/output mechanisms such as a display 64 and a speaker 66, a first wireless network interface 68 and its associated antenna 70, a second wireless network interface 72 and its associated antenna 74, means for determining a current geographic location 76, and fuel economy simulator logic 78. Although not illustrated, apparatus 10 may include further conventional components, such as a re-chargeable battery, signal processing circuitry, fixed and removable memory storage (e.g., SD card) and the like.

Processor 60 is configured generally to control the overall operation of apparatus 10, including coordination and cooperation among and between the other components of apparatus 10. In a constructed embodiment, for instance, the overall control may be achieved through execution by processor 60 of the IOS operating system currently being installed in IPAD tablet computers. Other mobile operating systems, such as the ANDROID operating system, or other operating systems in general, such as Windows, Mac OS X, Linux or the like may also be used in embodiments of apparatus 10. Apparatus 10 may also include any number of application programs stored in memory 62 and configured for execution by processor 60. For example only, processor 60 may be configured for email communication through an email client application (not shown).

Processor 60 may include one or more programmable microprocessors or microcontrollers. In addition, processor 60 may include a central processing unit (CPU), memory (in addition to or such as the illustrated memory 62) and an input/output (I/O) interface through which processor 60 may receive a plurality of input/output signals.

Memory 62 is provided for storage of data and instructions or code (i.e., software) for processor 60. Memory 62 may include various forms of non-volatile (i.e., non-transitory) memory including flash memory or read only memory (ROM) including various forms of programmable read only memory (e.g., PROM, EPROM, EEPROM) and/or volatile memory including random access memory (RAM) including static random access memory (SRAM), dynamic random access memory (DRAM) and synchronous dynamic random access memory (SDRAM).

Display 64 functions as an input/output device for the user of apparatus 10 and may include conventional components. Display 64 may be, for example, a liquid crystal display or light emitting diode display or other technologies known in the art. Display 64 may function as only an output device with input received through other I/O devices such as a keyboard. Alternatively, display 64 may also function as an input device and may include a touch screen display including, for example, conventional capacitive and resistive touch screen displays, or other technologies known in the art.

Speaker 66 is an electric to acoustic transducer that generates sound in response to electrical signals indicative of audio communications, and may be formed using conventional components.

Interface 68 (and its associated antenna 70) may be configured for short-range wireless communication, such as components that are compliant with Wi-Fi (i.e., IEEE 802.11) or Bluetooth standards. Interface 72 (and its associated antenna 74) may comprise a conventional wireless (cellular) network interface. The location determining means 76 may comprise a GPS transceiver or any other known mechanism for determining a geographical location.

The fuel economy simulator logic, designated by reference numeral 78, includes computer code configured to be stored in memory 62 and executed by processor 60. Such code is configured to perform the functions described herein for simulator logic 78.

Figure 6:
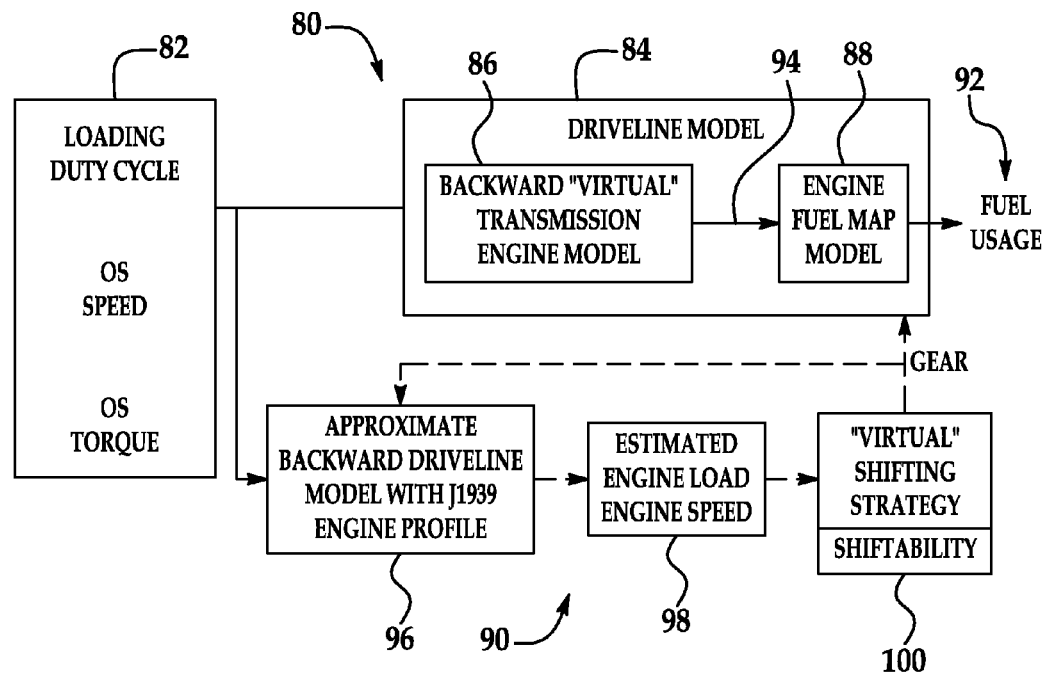
FIG. 6 is a block diagram showing an embodiment of the simulator logic of FIG. 5.

FIG. 6 is a block diagram view of an embodiment of an analyzer portion 80 of simulator logic 78. Analyzer portion 80 may include a duty cycle data storage unit 82, a driveline model 84 (which includes a backward "virtual" transmission model 86 and an engine fuel map model 88), and gear selection logic 90.

The virtual vehicle whose operation is to be simulated is the same as the baseline vehicle except that it substitutes a "virtual" transmission for the baseline transmission (i.e., in the form of an electronic model). Simulator logic 78 is configured to construct a duty cycle from the imported data set that is representative of the route, the driving behavior and the baseline vehicle performance. The analyzer portion 80 will then simulate the operation of the virtual vehicle along the same route (as the baseline) and in accordance with the constructed duty cycle in order to determine the projected fuel economy.

The duty cycle that achieves these objectives is one that reflects the same driving torque and speed on the wheels of the virtual vehicle as was observed on the baseline vehicle. In one embodiment, the duty cycle comprises transmission output-shaft (OS) speed and torque over time as the vehicle travels along the predetermined route.

The output-shaft (OS) speed may be a measured parameter, as a typical vehicle configuration includes an OS speed sensor. The OS speed over time is therefore typically available in the data set imported through the J1939 interface. However, if OS torque is not directly available in the J1939 data, then OS torque must be determined in some other way. If the mechanical efficiency of the baseline transmission is known a priori, then OS torque can be determined using information that is available. For example, engine output torque and engine output speed are typically available, as is OS speed as noted above and the baseline transmission gear and gear ratio. One can use these parameters along with mechanical efficiency information to determine OS torque using known power transfer equations.

Alternatively, if the mechanical efficiency of the baseline transmission is not known, then output-shaft torque can be estimated from vehicle acceleration if a model of the vehicle is available. Such a model of a vehicle would include environmental factors such as aerodynamic drag, rolling resistance, vehicle mass, tire diameter, real axle ratio, engine inertia, and driveline inertia, as well as route factors describing the road slope and driving surface. Exemplary methodology for estimating engine inertia, vehicle mass and road grade are set forth below in a separate section.

It should be appreciated that driving behavior is inherently reflected in the loading duty cycle as a function of time, as rapid increases/decreases reflect hard start and stops indicative of driving behavior, prevailing traffic and the like. Additionally, increases/decreases can also reflect the loading and unloading of cargo, which affects vehicle weight and reveals itself in the loading duty cycle. Once logic 78 determines the loading duty cycle for the route, this data is stored in storage unit 82.

Analyzer portion 80 replicates the loading duty cycle (i.e., plays back) for simulating the operation of the virtual vehicle. As shown, the driveline model 84 receives a stream of loading duty cycle values from block 82 (OS torque and speed) and determines a corresponding stream of fuel usage values, indicated at 92, reflecting the fuel consumed by the virtual vehicle. This process is continued until the same route taken by the baseline vehicle has been simulated for the virtual vehicle, while analyzer portion 80 accumulates fuel usage to produce the total fuel used.

Within driveline model 84, backward virtual transmission model 86 is configured to determine engine operating point 94, namely engine torque and speed, needed to match the OS torque/speed being specified by block 82. Note that model 86 needs to know the selected gear (FIG. 6—"Gear" input). Model 86 takes into account the mechanical efficiency of the "virtual" transmission as well as knowledge of the baseline engine obtained from the imported data set.

The engine fuel map model 88 is configured to provide a fuel usage parameter (e.g., Brake Specific Fuel Consumption—BSFC). The model 88 may be known a priori and stored in a data structure (e.g., a map provided by an engine manufacturer). Alternatively, the model 88 may comprise a reconstructed engine fuel map model, as described below in greater detail.

Shiftability for Gear Selection. As noted above, model 86 needs to know what gear should be used. Virtual shifting strategy 100 is configured to select an appropriate gear, based on "shiftability" criteria. Shifting strategy 100 will consider any gear as feasible so long as the resultant engine torque and speed do not fall outside an engine torque-speed profile associated with the baseline engine, which the analyzer portion 80 tries to match as closely as possible. In an embodiment, the engine torque-speed profile that is used is extracted from the imported data set (i.e., the J1939 data). Conversely, a gear is unavailable when the resulting engine torque and speed is outside the above-mentioned torque-speed profile. Known shifting strategies may be used. For clarity, in this embodiment, the shifting strategy is performed without regard to engine fuel map model 88. It should be noted that the particular shifting strategy used in the simulation may be the same as a production shifting strategy used in the virtual transmission that is being evaluated using the loading duty cycle. This approach produces results that correspond to actual vehicle configurations that are commercially available. However, other shifting strategies, for example, proposed shifting strategies not in commercial use, may alternatively be used in the simulation performed by apparatus 10 (e.g., to gauge customer interest).

In the illustrated embodiment, the OS torque and speed from the loading duty cycle can be reflected into the engine side per an approximate transmission model 96 of the virtual vehicle, which outputs an estimated engine load (torque) and speed (block 98), which in turn drives the shifting strategy 100 to select an appropriate gear. The "approximate" backward driveline model 96 is built to create desired engine speed and torque so that the shifting strategy can work out selected gears properly. The starting point is the backward driveline model 86, but more operational constraints with the virtual transmission are included for gear selection.

Through the foregoing, the virtual transmission based vehicle can substantially follow the loading duty cycle experienced by the baseline vehicle.

Engine Fuel Map Reconstruction. An engine fuel map is a relatively complex data structure having a number of input parameters to identify a corresponding desired fuel consumption rate (e.g., BSFC). An engine fuel map is typically developed by the engine manufacturer and in some instances may be considered proprietary. Nonetheless, in order to understand the fuel economy performance of the driveline operations, as described in this document, it is necessary to know at least the basic relationships expressed in an engine fuel map. However, when an engine fuel map is unavailable, an alternative must be found. Such a data structure that approximates an engine fuel map can be used for simulation purposes, such as described above for simulating the operation of a virtual vehicle.

Gear Selection for Fuel Map-Based Shifting Strategy (FMSS). In another embodiment, however, the reconstructed fuel map can be used as part of an integrated engine and transmission driveline that includes a shifting strategy that is based, at least in part, on information drawn from the reconstructed fuel map. As background, calibration of conventional transmission shifting strategies, for the most part, is empirical. While the empirical approach improves performance, including fuel economy, a more fuel-efficient transmission shifting strategy can be obtained when engine fuel map information is also considered. Such a methodology extends the use of the reconstructed fuel map to allow both the engine and transmission to operate in a manner that is most efficient for each while simultaneously satisfying vehicle driving power requirements. It should be understood that a fuel map-based shifting strategy can be used for simulation purposes but can also be used for actual control purposes in-vehicle. A method for fuel map reconstruction will be set forth in connection with FIGS. 7-8 while a fuel map-based shifting strategy will be described in connection with FIGS. 9A-9B and FIG. 10.

Figure 7:
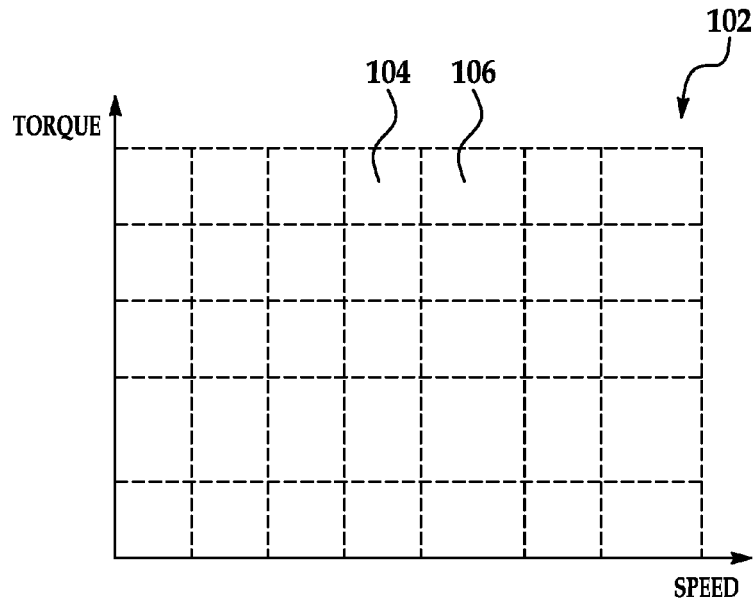
FIG. 7 is an engine speed versus torque diagram having uniform and non-uniform divisions.

FIG. 7 is an engine torque versus engine speed grid 102 upon which fuel consumption data can be plotted. The divisions can be square in shape, such as at 104, or rectangular in shape, such as at 106. As a result, the divisions of speed and torque can be either uniform ("square") or non-uniform ("rectangle") to meet a desired design requirement. The resulting grid, populated as described below, associates an estimated fuel rate with a corresponding engine speed and torque.

As to the source of the underlying engine data, as described above, data logger 24 can be configured to capture a variety of engine operating parameters associated with baseline vehicle 30. For purposes of description, baseline vehicle 30 will be the source of the relevant engine operating data, however, it should be understood that other sources can be used, particularly where the reconstructed fuel map is to be used for non-simulation purposes.

The collected engine operating data describes the engine dynamics as well as engine fuel consumption. The imported data set includes actual engine speed, actual engine torque as well as a corresponding fuel rate (e.g., L/h), as reported by the engine control module (ECM). These three signals lay out the fundamental foundation for fuel map reconstruction. Specifically, the time track of these pieces of data can be collected while the vehicle is driven while conducting daily activities. In an embodiment, a statistical approach is applied to the raw data, such as the imported data sets, to characterize the engine fuel consumption per divisions of engine speed and engine torque. For example, a simplified process may first involve identifying, for each engine operating point, a respective set of fuel rate values from the collected engine data. Then, determining, for each set of fuel rate values, the one fuel rate value that is the most probable to occur over the range of engine torque and speed. Finally, the last step may involve associating the most probable fuel rate value with its corresponding engine operating point to thereby form the reconstructed engine fuel map. The most probable term can be evaluated through various statistical approaches, including least-squares, a weighted average, or a modal approach using the value most frequently seen in the data for the particular engine operating point.

In the fuel economy simulator embodiment, the processor 60 is configured through programming to determine the reconstructed fuel map in accordance with the above approach.

Figure 8:
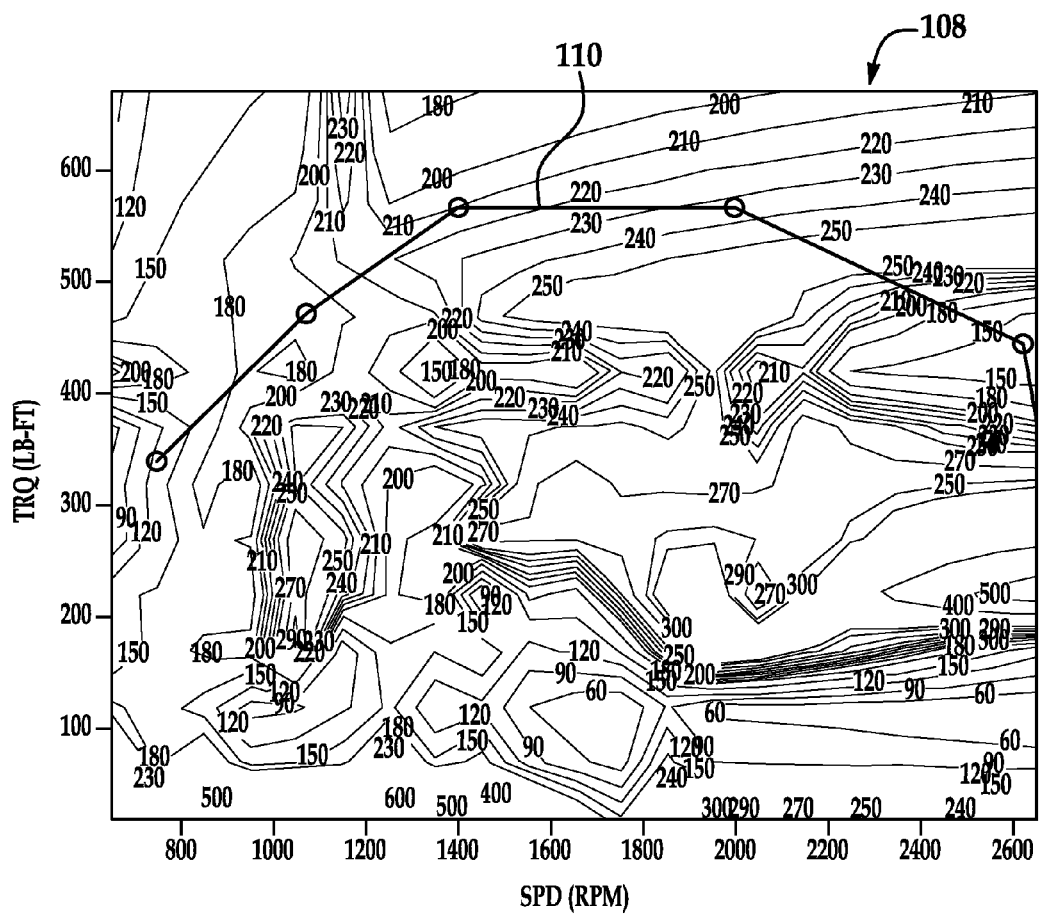
FIG. 8 is an engine speed versus torque diagram showing a reconstructed fuel map.

FIG. 8 is an exemplary reconstructed engine fuel map, designated by reference numeral 108. The reconstructed fuel map 108 illustrates fuel consumption rates for an exemplary diesel engine. FIG. 8 also shows trace 110 corresponding to the maximum torque/speed profile of such an engine.

It should be understood that variations are possible. For example, the reconstructed fuel map can be applied with so-called forgetting memory coefficients so as to favor the latest engine operating data. In the instance where engine performance changes over time (e.g., engine ages or wears), updated engine operating data can be utilized to develop an updated reconstructed fuel map that more accurately represents the current fuel consumption behavior of the engine.

In addition, since the process of fuel map reconstruction involves processing of a relatively large data set (e.g., the statistical approach noted above), an iterative procedure may be used. For example, iterative least squares or a Kalman filter approach can be used to reduce memory requirements. Such an iterative procedure can mitigate memory storage related issues, for example only, for real-time controls.

Moreover, the fuel map reconstruction method can be applied to engines other than a diesel engine or an internal combustion engine-only system (e.g., hybrid electric systems).

Figure 9A:
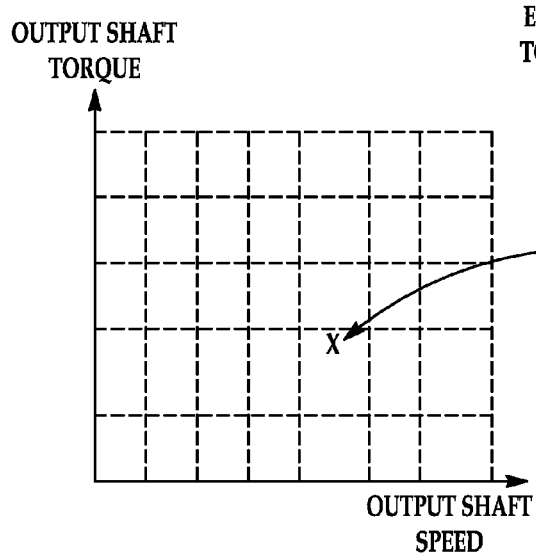
FIG. 9A is an output-shaft (OS) speed versus torque diagram.
Figure 9B:
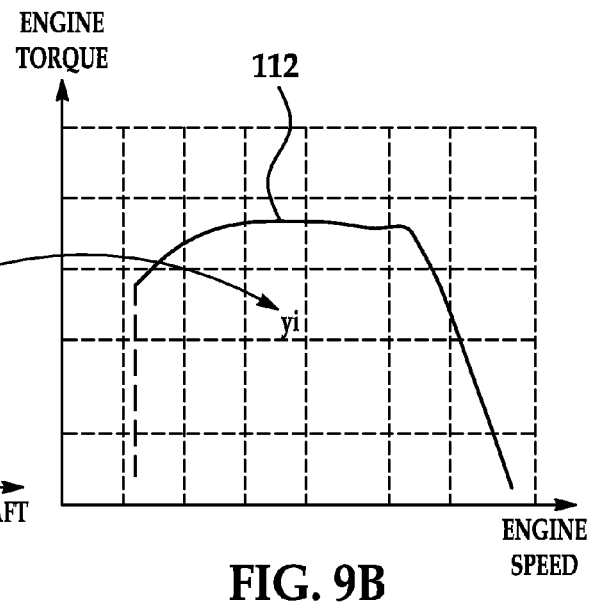
FIG. 9B is an engine speed versus torque diagram showing an engine speed-torque profile, along with an exemplary engine operating point mapped to a corresponding output-shaft operating point for a selected gear.

Fuel Map-Based Shifting Strategy (FMSS). The reconstructed engine fuel map can also be used outside of a simulation environment, and can be used in connection with the control and implementation of a transmission shifting strategy. FIG. 9A is an output-shaft torque versus speed diagram associated with a transmission whose operating gear is to selected. FIG. 9B is a corresponding engine torque versus speed diagram associated with an engine that is coupled to the transmission.

Assume that the transmission output-shaft torque and speed is either known or can be determined on an operational vehicle, such as a truck. This is a starting point. Next, when the mechanical efficiency of the transmission is known, then a corresponding engine operating point for each gear of the transmission can in turn be determined. Assume that the transmission has n number of gears. With n number of gears, there are theoretically n possible engine operating points. One engine operating point $y_i$ is shown in FIG. 9B. Engine operating point $y_i$, for a selected gear dictates a corresponding output-shaft operating point shown at x in FIG. 9A.

The mapping for only one gear is shown in FIGS. 9A-9B for purposes of illustrating the engine-to-transmission mapping process. However, among the n number of points $y_i$ some may fall outside of an engine speed-torque profile 112. All possible gears can be segregated into feasible gears or inhibited gears. Those gears whose resulting engine operating points $y_i$ are outside the profile 112 as gears that are labeled as not feasible. The strategy will inhibit selection of these gears. The remaining gears are considered feasible gears.

In an embodiment, the strategy assesses the engine operating points associated with the feasible gears to determine which gear will result in the lowest fuel consumption (e.g., BSFC). For this purpose, the strategy uses the reconstructed fuel map to search through these engine operating points to find the lowest fuel consumption. The strategy selects the feasible gear with the lowest associated fuel consumption rate as the candidate gear. The strategy may further include shifting the transmission to the candidate gear, to achieve the overall most efficient combined engine and transmission operating point.

Fuel Map Based Shifting Strategy for Automated Transmission Systems. In a variation, a method is provided for controlling gear selection in an automatic transmission that uses both the engine fuel map as well as the transmission efficiency to find the optimal gear. The method focuses on determining the most efficient operating points for both the transmission, in a particular gear, and the engine. The method will be set forth below and an embodiment of this method will be described in detail in connection with FIG. 10. The method includes a number of steps.

The first step involves providing an engine fuel map, at least with regard to engine net torque and speed. In the case of a reconstructed fuel map, this step may be performed as described above. Alternatively, an OEM engine fuel map (or portion thereof), if available, may also be used.

The second step involves creating a plurality of fuel maps, on a per-gear basis, with regard to output-shaft driving torque and speed. This step involves determining the correspondence between an engine torque-speed map, on the one hand, and an output-shaft torque-speed map, on the other hand, using a transmission efficiency map that is defined on a per gear basis. This step, in effect, combines the efficiency of the engine and the transmission, which in turn allows for an optimally efficient shifting strategy.

The third step involves deriving, using a transmission mechanical efficiency model, the effective driving torque on the output-shaft using the engine net torque as an input. This is the real time input that drives the gear selection logic. The transmission efficiency model used in this step may be dynamic or steady state.

The fourth step involves determining, using the per-gear fuel maps noted above, which one of the one or more feasible gears result in the lowest fuel consumption rate (e.g., BSFC).

The fifth step involves verifying that the selected gear from the fourth step will deliver the same torque and speed to the wheels as the current gear. However, it should be noted that anti-hunting controls may need to be included to prevent unnecessarily frequent shifts.

The method is also adaptive in nature. Gear selection is based on actual power delivered on the vehicle wheels. Thus, looked at from another perspective, the reconstructed fuel map can reflect prevailing (actual) engine operational performance, including the dynamic performance, steady-state performance, as well as effects due to aging.

Figure 10:
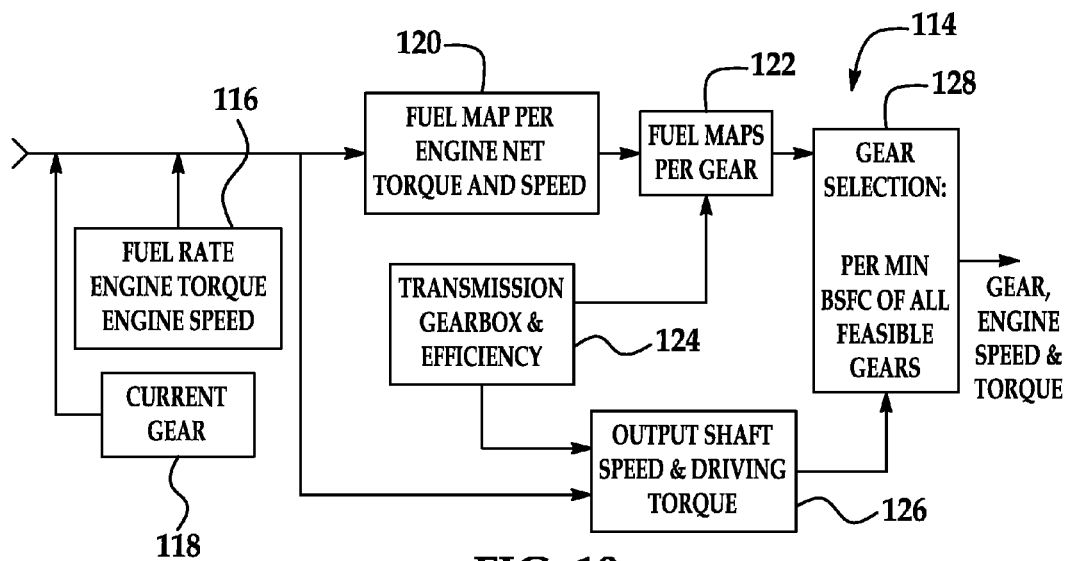
FIG. 10 is a block diagram showing fuel map-based shifting strategy.

FIG. 10 is a block diagram of a workflow and method 114, in an embodiment of the fuel-map based shifting strategy described above. Block 116 contains engine operational parameters and block 118 contains the current gear of the transmission.

In particular, block 116 may include the fuel rate, engine speed (e.g., rpm), engine actual torque (e.g., %'age), and engine nominal friction torque (e.g., %'age). The engine reference torque (e.g., as expressed in Nm) from the J1939 interface can be used to interpret and give a value to the percent torque signals to calculate engine actual torque and nominal friction torque expressed in Nm instead of a percentage value. The actual torque reading from the J1939 interface corresponds to the gross torque provided by the engine. The engine net torque can then be defined as follows in equation (1):

$$\text{Engine\_net\_torque} = \text{engine\_actual\_torque} - \text{engine\_nominal\_friction\_torque} \quad \text{Equation (1)}$$

However, the reported engine actual torque from the J1939 interface can be less than the nominal friction torque in some situations. Accordingly, when the net torque from equation (1) is less than zero, the equation (2) applies:

$$\text{Engine\_net\_torque} = \max(\text{engine\_actual\_torque}, \text{engine\_nominal\_friction\_torque}) \quad \text{Equation (2)}$$

When the engine is idling, equation (2) also needs to be applied to assign a value to the engine net torque.

In block 120, the next step involves reconstructing the engine fuel map using the engine fuel rate, the engine net torque and the engine speed. This step may be performed as described above. It should be noted that an engine fuel map may already exist from one or more previous vehicle driving sessions/J1939 data collections. Any existing fuel maps may be referred to herein as fuel_rate_map_existing per engine_net_torque_map and engine_speed_map. Any newly reported engine data can then be used to prepare an update, fuel_ rate_map_update(I, J) per updated engine net torque and engine speed. The update map fuel_rate_map_update(I, J) can then be applied to the existing reconstructed fuel map according to equation (3):

$$\text{fuel\_rate\_map}(I,J) = (1-\beta)*\text{fuel\_rate\_map\_existing}(I,J) + \beta*\text{fuel\_rate\_map\_update}(I,J) \quad \text{Equation (3)}$$

In equation (3) β can be any value between about 0.5 and 1. The value of β is a weighting that signifies how aggressively the existing map should conform to the new map.

The above approach is one where the reconstructed fuel map is continuously updated and is suitable for use in shifting control. This workflow is thus a recursive methodology, in an embodiment, and can be used to minimize the memory requirements as well as more accurately reflect actual engine operations. The improved accuracy results from continuously incorporating the most recent engine data.

In another embodiment, the reconstructed engine fuel map can be updated periodically, for example, at the end of every drive. This approach may involve storage requirement that are greater than for the continuously update approach, but has the advantage of involving only a single update.

In blocks 122-126, the method involves converting the fuel rate map per engine net torque and speed (output of block 120) to output-shaft driving torque and speed per the current gear. Each of these block will be described in turn.

In block 122, the method produces, for each gear, a respective fuel map with respect to output-shaft (OS) driving torque and speed. This conversion may be accomplished with the aid of a predetermined data structure or map—block 123—that correlates output-shaft torque and engine net torque using a transmission efficiency(gear) model, as set forth in equation (4) below:

$$\text{outputshaft\_torque\_map} = \text{engine\_net\_torque\_map} * \text{transmission\_efficiency}(\text{gear}) \quad \text{Equation (4)}$$

The transmission efficiency(gear) is a map that defines a mechanical efficiency (%'age) based on a specified gear. The transmission efficiency typically depends on gearing, load, lubrication, and temperature, to name a few factors. The transmission efficiency map (or model) may comprise predetermined (a priori) data, for example, from dynamometer testing or the like and stored in memory.

Due to the instantaneous reporting, via the J1939 interface, of the engine torque in correspondence to the drive operation, the reported engine torque can be used to determine the instantaneous driving torque, from the engine net torque on the output-shaft of the transmission gearbox, as specified in equation (5) below:

$$\text{outputshaft\_driving\_torque} = \text{engine\_net\_torque} * \text{transmission\_efficiency}(\text{gear}) \quad \text{Equation (5)}$$

Equations (4) and (5), in an alternate embodiment, can be replaced with a dynamic model configured to calculate the related output-shaft driving torque. If the very details of a transmission dynamic model are available, then the transmission dynamics, which can significantly affect OS torque and speed, can be accounted for in an analytic manner. In this embodiment, the driving OS torque can be calculated accordingly per a dynamic modeling approach. Regarding implementation, the dynamic model may correspond that model described above used for estimating output-shaft torque without mechanical efficiency data.

In block 128, the method executes a gear selection strategy. In this regard, the gear-dependent fuel maps and the instantaneous (or substantially so) output-shaft driving torque and speed are provided to block 128. Block 128 first identifies all feasible gears (e.g., through a backward driveline model, as described above in connection with FIGS. 9A-9B) that result in an engine torque and speed that falls within the engine torque-speed profile. Each identified candidate gear will have a corresponding fuel consumption rate (e.g., BSFC). The logic in block 128 selects one of the feasible gears that results in the lowest BSFC value. The selected gear resulting in the minimum BSFC value will be that gear that will help achieve the best fuel economy under the current driving conditions. In an alternate embodiment, the logic in block 128 may be further configured to select one of the feasible gears with the lowest BSFC value but that also meets some other criteria. In other words, a feasible gear with the lowest BSFC value may nonetheless not be selected by the logic because of the failure to meet some other predetermined criteria. For example, under certain special driving situations, such as demanding (e.g., steep) uphill and downhill driving, logic 128 can be configured to exercise special care to preclude selecting certain gears. In this way, safety in vehicle operations can have a higher priority relative to fuel consumption/savings. Based on the principle of fuel map-based shifting strategy (FMSS), the selected gear will have to satisfy the shiftability criteria described above, but will also have to be consistent with recommended driving practices according to various product specifications. In view of the above, the operation of a virtual vehicle can more realistically mimic actual vehicle operations to produce more realistic fuel economy numbers.

Overall, the fuel map-based shifting control considers the operating efficiency of both the engine and the transmission with regard to torque and speed of the output-shaft. As described above, the methodology can be used to select a transmission gear adapted to achieve the most efficient operation of the engine and transmission. The gear selection logic can be used either for simulation purposes (e.g., fuel economy) or for actual powertrain control. In addition, the methodology can be modified or augmented to provide a diagnostic function. For example, a diagnostic block (not shown) can be provided that maintains a copy of one or more engine fuel maps from an earlier time to be compared with subsequent fuel maps reconstructed at a later time. The differences in the respective fuel maps can be analyzed and a diagnostic conclusion can be reached and reported. For instance, it can be assumed that the initial (i.e., earliest in time) fuel maps reconstructed from the collected operational data reflect healthy engine operation. As time goes on, subsequent reconstructed fuel maps can be compared to the earlier ones. The logic can be configured to determine when the number of outliers (i.e., inconsistent fuel map values) exceeds a predetermined threshold value, and generate a notification. The notification can result in an external output to advise the user that engine maintenance may be necessary.

Driver Fuel Economy Scoring Based on Detailed Route, Real-Time Traffic, and Static Vehicle Configuration. While a number of driving behavior indices were described above in connection with apparatus 10, a further embodiment for describing driver behavior, in the form of a driver score, is provided. This driver score correlates with fuel economy and is based on the detailed route, real-time traffic as well as the static vehicle configuration, which in turn be used to separate out driver behavior from environmental conditions.

As background, a number of driver scoring methods are known. One approach involves checking the fuel economy (e.g., MPG) of a driver over a predefined route. Another approach involves using histogram analysis to determine a driver's shifting habits, for example, whether they can be characterized as "rev out", "short shift" or anything level in between. These existing driver scoring methods, however, do not take into account real-time road and traffic conditions experienced by the driver. Existing method may also be greatly affected by vehicle configuration, rather than truly reflecting just the driver behavior.

For instance, driver activities such as dense braking and very heavy acceleration are normal and actually needed in some situations. In dense traffic, frequent braking is normal. During on-ramp acceleration, very high acceleration may be needed for safe merging. In the other extreme, unsafe activities such as tailgating or very slow acceleration in fast traffic will save fuel, but at the expense of safety. In this regard, existing driver scoring methods may actually penalize safe driving behavior.

Likewise, histograms of engine operation behavior are similarly ineffective, because they are so greatly affected by transmission model, transmission calibration, rear axle ratio, tire size and the like. These types of vehicle configuration variables strongly influence a histogram-based driver score, even though a typical driver has no influence over them.

In an embodiment, apparatus 10 can be configured to use data histograms to identify driving events so that driving behavior can be categorized accordingly. Based on experience, data mining methodology can also be an option to find out patterns to distinguish those significant factors on fuel economy and driving characteristics. In an embodiment, the detailed route information that is collected by the data logger 24 can be analyzed to determine how the driving habits of the operator impact fuel economy.

One way to analyze driver data is to divide a drive cycle into relatively small intervals (for instance 30 seconds or 1 minute) and to group these intervals into a variety of scenarios. Within each scenario the intervals share a common feature such as expected acceleration rate, expected speed, expected braking frequency, and the like. If traffic information is available over the course of the drive cycle, then the various driving intervals can be additionally grouped according to traffic density.

For example, assume that traffic and/or GPS information is available that can used to separate "low traffic" and "high traffic" driving conditions. With this information, each driving interval (for instance 30 seconds or 1 minutes) can be assigned either a "low traffic" or "high traffic" designation.

Furthermore, assume that the road geometry information of the route of interest is also available. Such information can include road grade, speed limit, location of construction zones, and weather conditions that are obtained from one or more of the following sources: a GPS device, a digital map, other onboard and/or roadside sensors, and/or any combination of the foregoing. For example only, if the vehicle is located near an on-ramp, starting from stop, leaving a construction zone, leaving heavy weather conditions, or approaching a road with a higher speed limit, then an up-speed transition could be expected. For further example only, if the vehicle is located near an off-ramp, approaching a stop sign or a red light, approaching an intersection to make a turn, approaching a construction zone, approaching heavy weather conditions, or approaching a road with a lower speed limit, then a down-speed transition could be expected.

After grouping driving data into scenarios, the expected (or the most fuel efficient) driving behavior to navigate through each scenario can be determined based on the road and traffic conditions of the scenario and the selected vehicle powertrain configuration. Such behavior can often be described by a set of quantitative performance metrics including the expected speed and acceleration. By comparing the driver response (i.e., the actual driving behavior) to the expected behavior, a fuel economy scoring index can be obtained. Because the scoring index will be scenario specific, it separates out the effects of the environment from driver effects. For instance, the percentage of total time in each of the scenarios can be determined and displayed, as shown in exemplary fashion in Table 4 below. This can be interpreted as the environmental conditions experienced by each of the drivers.

TABLE 4

Driver Scoring—Percentage Time in Various Scenarios

| Environmental Conditions | Dynamic | |
|---|---|---|
| | No traffic | Traffic |
| Static | | |
| Up-speed transition | Scenario #1-5% | Scenario #2-5% |
| Down-speed transition | Scenario #3-3% | Scenario #4-5% |
| Speed keeping | Scenario #5-75% | Scenario #6-2% |
| ELSE | Scenario #7-5% | |

Figure 14:
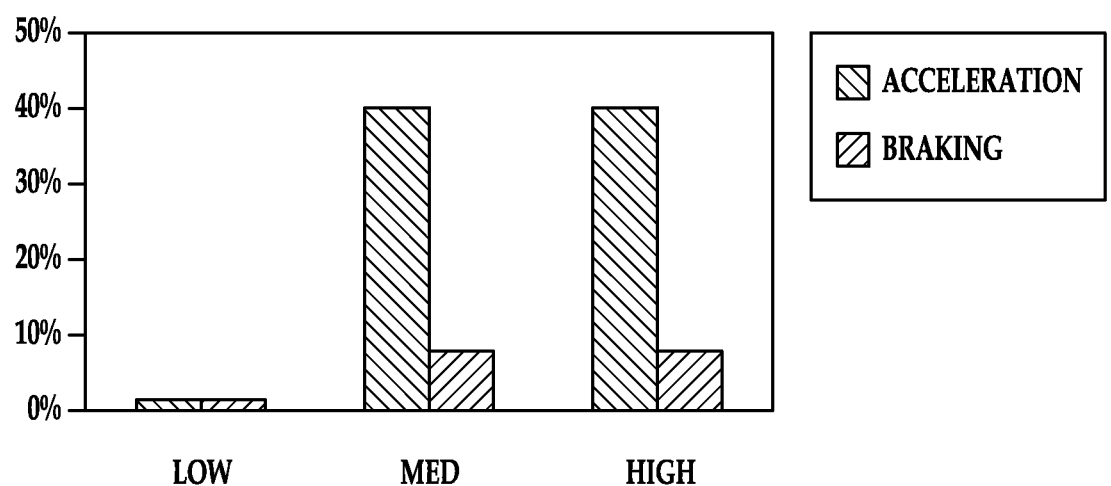
FIG. 14 is a bar chart showing acceleration and braking input histogram values for a driving scenario that is used in determining a driver scoring index.

One example of a quantitative performance metric that can be used to assess driver response in each of the example scenarios may be a histogram. In this regard, one or more histograms can be developed that show the frequency of high, medium, and low accelerator inputs, and high, medium, and low vehicle braking inputs, for example as depicted in FIG. 14.

From these histograms, a variety of driver performance indices can be constructed. One such index can be an "Efficiency Index" which is the histogram percentage the driver spends in low acceleration or low braking conditions while in a no traffic, speed keeping scenario. Another such index can be an "aggressiveness" index, which is the average of "high acceleration" histogram values for up-speed, traffic and down-speed traffic scenarios. A variety of other implementations are possible. The foregoing example is one way that driver behavior can be separated from environmental factors in the construction of a driver scoring index.

The benefit of a driver scoring method that incorporates detailed route information, real-time traffic information, and static vehicle configuration is that it can separate out driver behavior from environmental conditions. This segregation can have many uses. For example, apparatus 10, as described above, can be configured to separately report the fuel savings that can be obtained from equipment changes, such as transmission changes, real axle changes, etc., on the one hand, versus fuel savings that can be obtained from improved driver training. The method may be implemented on conventional computing apparatus known in the art.

Realistic Driving Cycle Using a Map System. A realistic driving cycle is valuable for product development, marketing and customer service, among other things. While it is known to operate an instrumented vehicle over a route to collect the data need, this method is time consuming and relatively costly. The following system and method allows one to obtain a realistic driving cycle by using a so-called Map Interactive Simulation on a computer, without actual driving, thereby improving efficiency and reducing cost. There are many uses for the map system-based driving cycle. For example only, the fuel economy simulator logic 78 described above can use the map system-based driving cycle to create a loading duty cycle when data sets based on collected data from operation of baseline vehicle 30 are unavailable. In other words, a digital map system (as described below) can be used to "virtualize" and replace the operation of baseline vehicle 30 over route 32 to produce data set 24. This capability can be valuable when installation of a data logger is not possible or not desirable. This capability also provides at least some measure of tailoring the simulation to the circumstances of the customer, more specifically the customer's route ("my route"). In another embodiment, the map system-based driving cycle can be used in product development. Other uses are also possible. The description below place an emphasis on producing a virtualized "loading" duty cycle.

Figure 11:
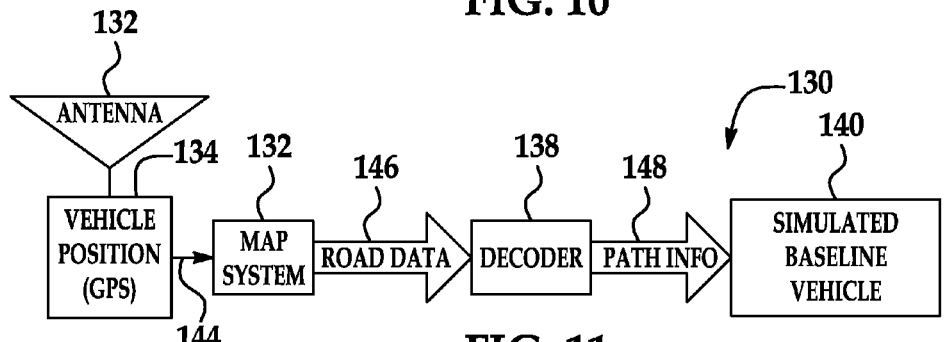
FIG. 11 is block diagram showing a system configured to use a digital map system to obtain road data for a simulated baseline vehicle operation.

FIG. 11 is block diagram showing a system 130 configured to use a map system 132. FIG. 11 further shows a vehicle GPS 134 (and associated antenna 136), an information decoder 138, and a simulated baseline vehicle 140. During virtual vehicle operation, GPS 134 or other position source can feed position information 144 into map system 132. Map system 132, using position data 144, retrieves various road information 146, indicative of roadway speed limits, traffic signs, road slope and the like, that lay ahead of the simulated baseline vehicle 140. The decoder 138 decodes road data 146 and outputs path information 148, which is provided to the simulated baseline vehicle 140.

In an embodiment, map system 132 may be a commercially available digital map system sold under the name ADVANCED DRIVER ASSISTANCE SYSTEMS RESEARCH PLATFORM (ADASRP) from Navteq, Chicago, Ill., USA. The ADASRP map system provides a framework application and software development kit (SDK) for developing map enabled systems. The map system 132 can provide important road information useful in developing a loading duty cycle that can be used by simulator logic 78.

Figure 12:
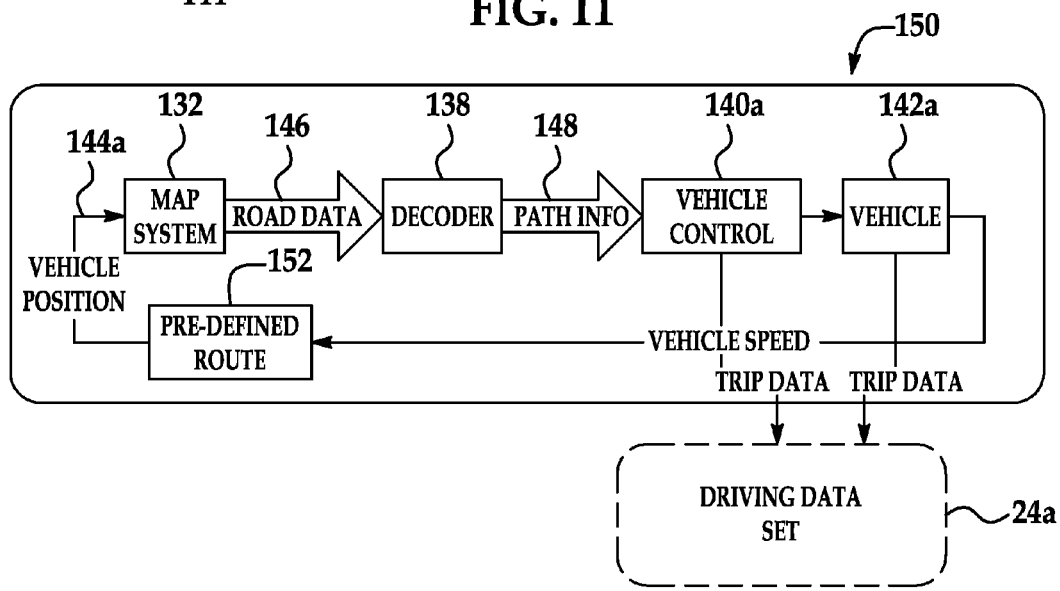
FIG. 12 is a block diagram showing a system configured to use a digital map system to produce realistic driving cycle in the form of a driving data set.

FIG. 12 is a block diagram of a system 150, which shows a particular application of system 130 to produce a loading driving cycle, herein referred to as a driving data set 24a. In system 150, simulated baseline vehicle 140 is represented by a vehicle control 140a and a vehicle model 142a to model the baseline vehicle's operation. System 150 further includes a predefined route 152 that includes a description of a pre-defined route over which the operation of vehicle model 142a is simulated. In the context of the fuel economy simulator 10 in FIG. 1, the pre-defined route may a route provided or defined by a customer in order to generate a tailored fuel economy simulation ("my route").

Model 142a is configured to output at least the vehicle speed of the simulated baseline vehicle. The system 150 is further configured to integrate the simulated vehicle speed to obtain the simulated vehicle position on the pre-designated route on the map. In the illustrated embodiment, the pre-defined route block 152 is the structure that is fed with the advancing vehicle speed and, as noted above, determines the vehicle position 144a along the predetermined route. In the simulation mode, the calculated position 144a is used as an input to map system 132.

FIG. 12 further shows a driving data set block 24a. For purposes of generating a realistic driving cycle customized as per a specified vehicle route, block 24a is configured to record various trip and vehicle data. More specifically, since system 150 includes a vehicle control 140a and a vehicle model 142a, specific information recording driving torque can be obtained, just like in the case where a data logger 24 is used to record information concerning the real baseline vehicle 30. This information includes, without limitation, vehicle operational items as well as information associated with the route drawn from map system 132, such as cycle speed, grade (e.g., a speed versus grade profile), speed limits, real-time or historically-aggregated traffic flow information, traffic sign type and associated location, powertrain information such as the torque versus time profile and the like. The driving cycle information contained in block 24a (e.g., speed/grade profile, etc.) may be maintained separately from the loading duty cycle information (e.g., torque/speed profile).

Figure 13:
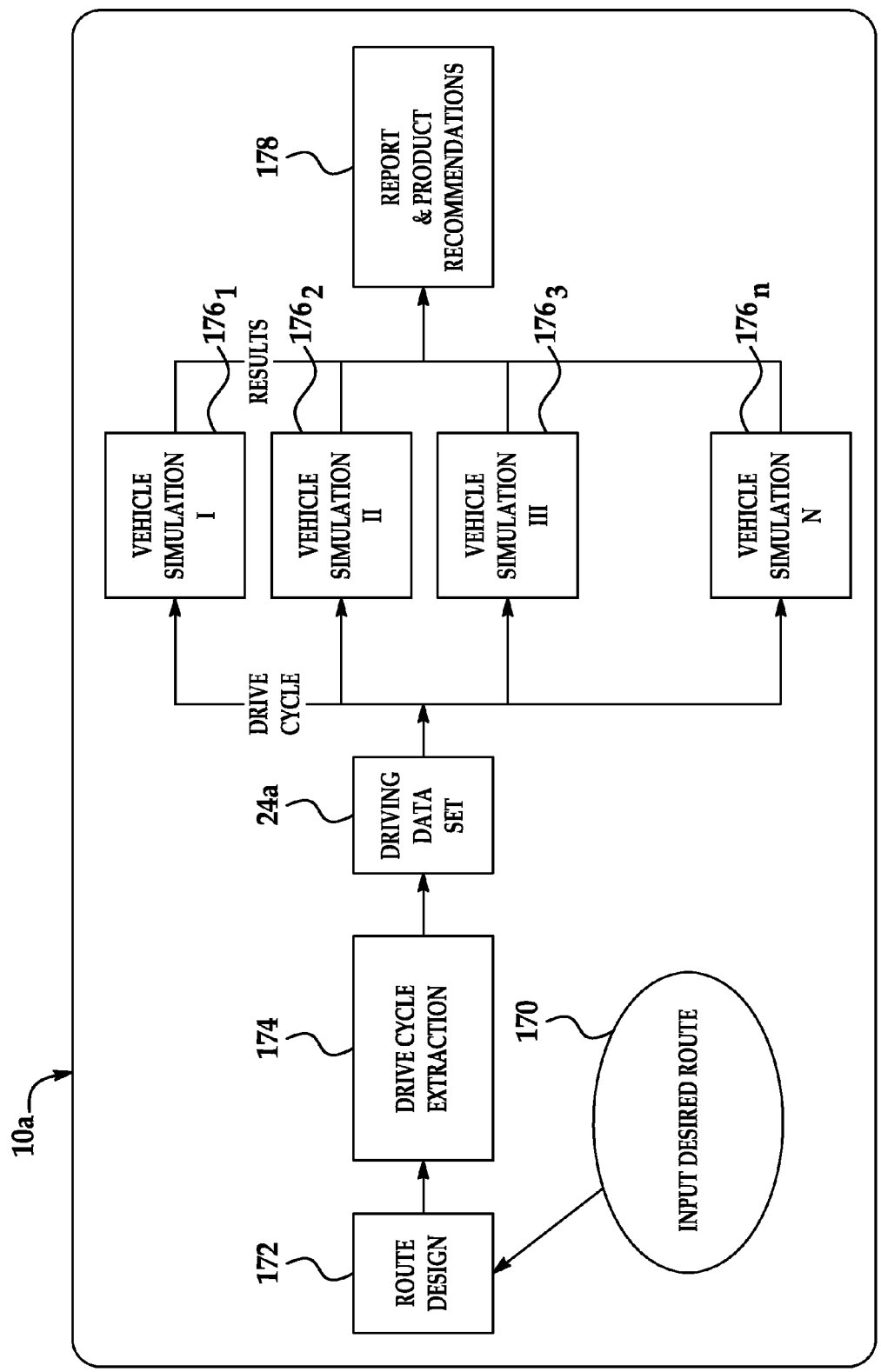
FIG. 13 is a block diagram showing an apparatus for estimating performance of one or more virtual vehicles, using the driving data set obtain in FIG. 12.

FIG. 13 is a block diagram showing an apparatus 10a for estimating performance of one or more virtual vehicles using the driving data set 24a obtained using the digital map system 132. In particular, the map system-based driving system can be used for sales and marketing support. FIG. 13 illustrates such an application using an apparatus 10a, which may be generally the same as apparatus 10, but configured as described below. Such an application involves a number of steps.

In step 170, the user can input a desired route, such as a customer's delivery route.

In step 172, the user can alter (or bypass alteration) the customer's route or design a new route of his choice.

In step 174, the user can submit the input or designed route to the driving data set generation block (see FIG. 12, producing driving data set 24a). The driving data set 24a is then provided forward for simulating the operation of several virtual vehicles.

The illustrated embodiment shows an application where several simulations are conducted, which are designated simulations $176_1$, $176_2$, $176_3$, ..., $176_n$. Each simulation $176_1$, $176_2$, $176_3$, ..., $176_n$ is associated with a respective virtual vehicle that is perhaps configured with a different component or components, but all using the same input driving data set 24a. The individual results from each of the simulations $176_1$, $176_2$, $176_3$, ..., $176_n$ are combined into a report 178. The report allows the user (or a customer) to see the differences in performance between the different vehicle configurations and allows head-to-head comparisons. Apparatus 10a may be further configured to automatically recommend one of the virtual vehicles based on the simulation results, such as based on one or more specified performance criteria (e.g., fuel economy).

It should be appreciated that, in one embodiment, vehicle simulations $176_1$, $176_2$, $176_3$, ..., $176_n$ may be configured to operate in a more or less conventional, forward-flowing sense, where the simulation uses data contained in the driving data set 24a that corresponds to the description of speed/grade, road conditions, etc., that the vehicle encounters. In this situation, the simulator estimates the needed engine operating point and thus determines fuel consumption. In another embodiment, however, the simulations $176_1$, $176_2$, $176_3$, ..., $176_n$ may be configured more similarly to that described above, where a loading duty cycle is used (i.e., backwards from the point of view of specified driving torque and speed at the wheels) to thus determine the corresponding engine operating point and thus fuel consumption. The latter configuration more closely corresponds to a true virtualization of the baseline vehicle 30/route 32/data collection 24 blocks shown in FIGS. 1-6.

Multi-Stage Estimation of Engine Inertia, Vehicle Weight and Road Grade. There are other uses for the vehicle operational data obtained via the J1939 interface described in connection with FIG. 1. For example, such data may be used to estimate engine inertia, vehicle weight and road grade. While the fuel economy simulator (apparatus 10) described above in connection with FIGS. 1-6 beneficially do not need to know vehicle weight, among other parameters, it contemplated alternate embodiments may use, at least in part, vehicle weight information, in verifying and/or improving fuel economy assessments. While there are other uses for estimated engine inertia, vehicle weight and road grade, one or more of these parameters may be used at least an adjunct to the main fuel economy simulation approach described above (i.e., using loading duty cycle). As an additional example, where transmission mechanical efficiency is not known (or not know perfectly) a priori, the multi-stage estimate methodology can be used to obtain output-shaft torque, as described above in producing a loading duty cycle.

As to vehicle mass and road grade, one line of approaches involves algorithms that have assumed that engine inertia is known and that torque loads due to accessory loads are negligible. This assumption works well in many test cases and leads to estimates of vehicle mass and road grade that fall within a certain (acceptable) degree of accuracy. It has been observed, however, that the resulting estimates are not applicable to all test cases. The algorithm described below addresses the assumption that the engine inertia is known a priori and can be ignored if the gear goes beyond a relatively small gear ratio. In some test cases, these assumptions can result in a less than desirable estimate.

The multi-stage estimation method recognizes that transmission ratios can significantly affect the driveline inertia that is used to describe the longitudinal dynamics of the vehicle. The method further recognizes that the driveline inertia is mainly composed of engine inertia and vehicle mass. Engine inertia can therefore be a significant portion of the driveline inertia at low gears, while the engine inertia can be ignored at top gears. The multi-stage estimation algorithm deals with the effect of engine inertia on vehicle mass estimation. In an embodiment, the engine inertia and the vehicle mass can be estimated simultaneously. In an embodiment, apparatus 10 can be configured to implement the multi-stage method. However, in alternate embodiment, the multi-stage estimation can be performed on a programmable, general purpose computer, having access to the J1939 data described above.

The longitudinal dynamics for an automatic mechanical transmission (AMT) based vehicle (e.g., truck) can be represented by the following equation (6):

$$\dot{V} = \left[\frac{T_e - J_e\dot{\omega}}{R_{whl}/(r_{fd}r_{GB})} - F_{brake} - F_{aero}\right]\frac{1}{M} + \frac{g}{\cos\beta_\mu}\sin(\beta + \beta_\mu) \quad \text{Equation (6)}$$

where $\dot{V}$ is the truck acceleration, $\omega$ is the engine rotational speed, M is the vehicle weight to be estimated, V is the truck speed, $\mu$ is the tire rolling resistance (and define $\tan\beta_\mu = \mu$), and $\beta$ is the road slope to be estimated, $T_e$ represents the engine torque, $J_e$ is the engine inertia, g is the gravity, $\dot{\omega}$ is the engine rotational acceleration, $r_{fd}$ is the final drive ratio, $r_{GB}$ is the gear ratio, $F_{brake}$ is the braking force, $F_{aero}$ is the air drag resistance, and $R_{whl}$ is the wheel resistance.

Now the engine inertia term moves to the right-hand side as following in Eqn. (7):

$$J_d\dot{V} = \left[\frac{T_e}{R_{whl}/(r_{fd}r_{GB})} - F_{brake} - F_{aero}\right]\frac{1}{M} + \frac{g}{\cos\beta_\mu}\sin(\beta + \beta_\mu) \quad \text{Equation (7)}$$

where the combined driveline inertia is $$J_d = \left[1 + \frac{J_e}{[R_{whl}/(r_{fd}r_{GB})]^2}\frac{1}{M}\right] \quad \text{Equation (8)}$$

because the engine speed and the vehicle speed have the following relationship $$\omega = \frac{(r_{fd}r_{GB})}{R_{whl}}V$$

In addition, the net engine torque can be obtained from the J1939 data as following $$T_e = T_{gross} - T_{friction}$$

Then equation (7) can be concisely written as equation (9):

$$y = \phi^T\theta \quad \text{Equation (9)}$$

where $y = \dot{V}$;

$\phi = [\phi_1 \phi_2]^T$ $= \left[\frac{T_e}{R_{whl}/(r_{fd}r_{GB})} - F_{brake} - F_{aero}\frac{\delta}{\cos\beta_\mu}\right]^T$;

$\theta = [J_d\sin(\beta + \beta_\mu)]^T$

The processing occurs in three stages.

In the first stage, the following steps are processed. The approach developed in Eqn. (6) through (8) can be applied to Eqn. (9) to estimate the driveline inertia $J_d$ and the grade dependent sine term. It is worth noting that the driveline inertia is estimated per gear.

In the second stage, with the known driveline ratios (i.e., the gear ratio, the axle ratio and the wheel diameter), the least mean square method can be applied to Eqn. (8) to separate the vehicle mass and engine inertia from the estimated driveline inertia $J_d$ from the first stage.

In the third stage, since the estimated inertias can be applied back to Eqn. (6) or (7), then the road grade can be estimated with the recursive algorithm.

This algorithm requires less initial data to operate. If engine inertia values are not known, the algorithm will result in more accurate estimates of grade and vehicle weight. Even if engine inertias are known/available, the above-described algorithm has benefits, including the capability to estimate engine inertia that can be in turn compared against a specified value, to act as a "consistency check." If the respective inertia values match, then a greater level of confidence can be assigned to the simultaneous estimates of vehicle mass and road grade also produced by the algorithm.

A multi-stage method is provided for estimating engine inertia, vehicle mass and road grade. The method considers the significant effect of engine inertia on the driveline longitudinal dynamics, especially at low gear, i.e., starting gears. For example, during vehicle launch, engine inertia can be a significant portion of the driveline inertia and at the same time the vehicle acceleration can be significant as well. The larger the acceleration component, the better the estimation can be. Conversely, when the engine inertia is not properly treated in the model, deviations in the estimation of the vehicle mass can occur. If the calculated vehicle mass is accurate, then the road grade value can also be more accurately estimated. In a constructed embodiment, test data shows that the mass estimation accuracy can reach the 10% range, while the road grade estimate can follow GPS data signals quite well.

The foregoing numerous embodiment solve one or more problems known in the art.

It should be understood that an electronic processor as described above for certain embodiments can include conventional processing apparatus known in the art, capable of executing pre-programmed instructions stored in an associated memory, all performing in accordance with the functionality described herein. To the extent that the methods described herein are embodied in software, the resulting software can be stored in an associated memory and can also constitute the means for performing such methods. Implementation of certain embodiments, where done so in software, would require no more than routine application of programming skills by one of ordinary skill in the art, in view of the foregoing enabling description. Such an electronic processor can be of the type having both ROM, RAM, a combination of non-volatile and volatile (modifiable) memory so that the software and predetermined data can be stored and yet allow storage and processing of dynamically produced data and/or signals.

It should be further understood that an article of manufacture in accordance with this disclosure includes a computer-readable storage medium having a computer program encoded thereon for implementing the fuel economy simulator logic and other functionality described herein. The computer program includes code to perform one or more of the methods disclosed herein.

While particular embodiments of the invention have been shown and described, numerous variations and alternate embodiments will occur to those skilled in the art. Accordingly, it is intended that the scope hereof be limited only in terms of the appended claims.

What is claimed is:

1. An apparatus for determining a performance characteristic of a virtual vehicle, comprising:
    an electronic processor;
    a memory coupled to the processor; and
    simulator logic stored in the memory and configured to be executed by the processor, the logic being configured for
    constructing a duty cycle based on a data set representative of the operation of a baseline vehicle during travel along a route, the data set including at least route data with distance and vehicle speed information, engine data associated with an engine of the baseline vehicle, and operational element data associated with a baseline operational element of the baseline vehicle;
    defining a virtual vehicle that includes a virtual operational element different than and in substitution of the baseline operational element; and
    determining a performance characteristic of the virtual vehicle using at least the constructed duty cycle.

2. The apparatus of claim 1 wherein the baseline operational element is selected from the group comprising a transmission, the engine, a set of tires, an axle with a predetermined axle ratio and a vehicle aerodynamic treatment.

3. The apparatus of claim 1 wherein the baseline operational element comprises a baseline transmission and the performance characteristic comprises a projected fuel usage associated with the virtual vehicle for the route.

4. The apparatus of claim 3 wherein the data set further includes an actual engine speed, an engine actual torque, an engine nominal friction torque, an engine reference torque, and a throttle rate.

5. The apparatus of claim 3 wherein the simulator logic is configured to generate a report including at least identification information associated with the baseline vehicle, the virtual vehicle, and the projected fuel usage of the virtual vehicle.

6. The apparatus of claim 5 further including an email client application configured for execution on the processor, the simulator logic being configured to attach the generated report to an email message addressed to a user-specified destination address, the email client application being configured to transmit the message.

7. The apparatus of claim 3 wherein the constructed duty cycle comprises at least an output-shaft speed and an output-shaft torque produced by the baseline transmission during the time during which the baseline vehicle travels the route.

8. The apparatus of claim 7 wherein the simulator logic further includes
    a virtual transmission model configured to estimate engine operating parameters based on the constructed duty cycle and a selected gear;
    an engine fuel map configured to produce a fuel usage parameter based on the estimated engine operating parameters; and
    means, responsive to the fuel usage parameter, for determining the projected fuel usage of the virtual vehicle.

9. The apparatus of claim 8 further including shift scheduling logic configured to determine the selected gear based on the constructed duty cycle.

10. The apparatus of claim 3 wherein the simulator logic is further configured to determine an actual fuel usage of the baseline vehicle configured with the baseline transmission and to determine a difference between the actual fuel usage of the baseline vehicle and the projected fuel usage of the virtual vehicle.

11. The apparatus of claim 10 wherein the simulator logic is configured to generate, using the dataset, a first driving index indicative of driver behavior and a second driving index indicative of environmental conditions encountered by the baseline vehicle, said simulator logic being further configured to segregate differences in the fuel usage attributable to the driver and to environmental conditions, respectively, using the first and second driving indices.

12. The apparatus of claim 10 wherein said simulator logic is further configured to calculate a financial parameter as a function of the determined difference in fuel usage and a predetermined fuel cost.

13. The apparatus of claim 12 wherein said simulator logic is further configured to receive an input from a user to define the predetermined fuel cost.

14. The apparatus of claim 12 further including means for determining a current location of said apparatus, the simulator logic being further configured to retrieve the predetermined fuel cost from a remote system based on at least the current location of the apparatus.

15. The apparatus of claim 14 wherein the means for determining the current location comprises one of a global positioning system (GPS) unit and a wireless locator.

16. The apparatus of claim 1 wherein the simulator logic is further configured to determine at least one driver behavior index based on the data set and selected from the group comprising an idle time index, a hard acceleration index, a hard braking index and a cruise driving index.

17. The apparatus of claim 16 wherein the simulator logic is configured to segregate data in the data set on a per-day basis, the simulator logic being further configured to determine respective projected fuel usage values on a per-day basis using the segregated data.

18. The apparatus of claim 17 further comprising a display wherein the simulator logic is further configured to selectively output to the display an animation representative of the route traveled by the baseline vehicle on a user selected day.

19. The apparatus of claim 18 wherein the simulator logic is further configured to output to the display a chart, concurrent with the animation, showing the fuel usage difference between the baseline vehicle and the virtual vehicle.

20. An apparatus for determining the fuel economy of a virtual vehicle, comprising:
an electronic processor;
a memory coupled to the processor; and
simulator logic stored in the memory and configured to be executed by the processor, the logic being configured for
constructing a loading duty cycle based on a data set representative of the operation of a baseline vehicle during travel along a route, the loading duty cycle being indicative of the driving behavior of a driver of the baseline vehicle, the baseline vehicle including an engine coupled to a baseline transmission wherein the data set includes at least engine data and transmission data;
defining a virtual vehicle that is the same as the baseline vehicle but that substitutes a virtual transmission for the baseline transmission; and
simulating the operation of the virtual vehicle along the route in accordance with the constructed loading duty cycle in order to determine the projected fuel economy of the virtual vehicle.

21. The apparatus of claim 20 wherein the data set is generated from one of (i) measured data collected from an operational baseline vehicle equipped with a data logger coupled to a vehicle communication bus and (ii) virtualized data obtained from a virtualization of the baseline vehicle including a digital map system.

22. The apparatus of claim 20 wherein the constructed loading duty cycle comprises at least transmission output-shaft speed and torque produced by the baseline transmission during a time interval during which the baseline vehicle traveled the route.

23. The apparatus of claim 22 wherein said simulator logic configured to determine the loading duty cycle further includes means for determining output-shaft torque based at least in part on one of (i) predetermined mechanical efficiency data associated with the baseline transmission and (ii) a dynamic baseline transmission model that includes at least vehicle mass estimation logic.

24. The apparatus of claim 22 wherein the simulator logic further includes
a virtual transmission model configured to estimate engine operating parameters based on the constructed loading duty cycle and a selected gear;
an engine fuel map configured to produce a fuel usage parameter based on the estimated engine operating parameters; and
means, responsive to the fuel usage parameter, for determining the projected fuel usage of the virtual vehicle for the route.

25. The apparatus of claim 24 further including shift scheduling logic configured to determine the selected gear based on the constructed loading duty cycle.

26. A method of operating a vehicle having a driveline that includes an engine and a multi-gear transmission having an output-shaft, the method comprising the steps of:
producing, using an engine fuel usage map defined for engine speed and torque, a respective driveline fuel map defined for an output-shaft driving torque and speed for each gear of the transmission;
determining, during operation, an effective output-shaft driving torque and speed;
identifying, using at least the output-shaft driving torque and speed, one or more feasible gears whose corresponding engine operating point lies within an engine torque-speed profile;
selecting from the feasible gears a candidate gear having the lowest fuel usage wherein the selecting step uses the driveline fuel maps and the determined output-shaft driving torque and speed; and
shifting the transmission to the candidate gear.

27. The method of claim 26 wherein the step of producing the plurality of per-gear driveline fuel maps includes the sub-step of:
determining a correspondence between an engine torque map and an output-shaft torque map using a transmission efficiency map that is defined on a per gear basis.

28. The method of claim 26 further including the step of:
reconstructing an engine fuel map using engine torque, speed and fuel usage data collected during operation of the engine.

29. The method of claim 28 wherein the reconstructing step includes the sub-steps of:
identifying, for each engine operating point, a respective set of fuel rate values from the collected engine data;
determining, for each set of fuel rate values, the one fuel rate value that is the most probable to occur over the range of engine torque and speed;
associating, for each engine operating point, the determined most probable fuel rate value to thereby collectively define the reconstructed engine fuel map.

30. An apparatus for determining a driving data set for a vehicle traveling over a predetermined route, comprising:
- an electronic processor;
- a memory coupled to the processor; and
- map interaction simulation logic stored in the memory and configured to simulate the operation and movement of the vehicle over the predetermined route in accordance with a map system that includes road data wherein the map interaction simulation logic is configured to produce (i) vehicle operation data and (ii) vehicle trip data that includes road data; and
- driving data set construction logic stored in the memory and configured to output the driving data set based on the vehicle operation data and the vehicle trip data wherein the driving data set includes vehicle driving torque data over the route.

31. The apparatus of claim 30 further including
- performance simulator logic stored in the memory and configured to be executed by the processor, the performance simulator logic being configured to simulate the operation of one or more virtual vehicles along the predetermined route in accordance with the constructed driving data set to determine a projected performance characteristic for each virtual vehicle.

32. The apparatus of claim 31 wherein the performance characteristic comprises a fuel economy parameter.

* * * * *